US009637942B2

(12) United States Patent
White

(10) Patent No.: US 9,637,942 B2
(45) Date of Patent: May 2, 2017

(54) THEFT RESISTANT UPSTANDING MOUNT FOR TEMPORARY POSITIONING OF COSTLY EQUIPMENT AT UNATTENDED OUTDOOR LOCATIONS

(71) Applicant: Franklin B. White, Ft. Pierce, FL (US)

(72) Inventor: Franklin B. White, Ft. Pierce, FL (US)

( * ) Notice: Subject to any disclaimer, the term of this patent is extended or adjusted under 35 U.S.C. 154(b) by 0 days.

(21) Appl. No.: 14/545,137

(22) Filed: Mar. 31, 2015

(65) Prior Publication Data
US 2015/0292226 A1 Oct. 15, 2015

Related U.S. Application Data

(63) Continuation-in-part of application No. 29/463,908, filed on Apr. 2, 2014, now Pat. No. Des. 731,872, and (Continued)

(51) Int. Cl.
*F16M 13/02* (2006.01)
*E04H 12/00* (2006.01)
(Continued)

(52) U.S. Cl.
CPC ......... *E04H 12/003* (2013.01); *E04H 12/182* (2013.01); *E05B 73/00* (2013.01);
(Continued)

(58) Field of Classification Search
CPC ........ E04H 2/003; G01C 15/00; F16M 11/14; F16M 2200/024; F16M 13/02; E05B 73/00
(Continued)

(56) References Cited

U.S. PATENT DOCUMENTS 197,369 A * 11/1877 Hoffman ................ F16M 11/12
248/180.1
202,916 A * 4/1878 Young .................... F16M 11/12
248/180.1
(Continued)

FOREIGN PATENT DOCUMENTS

DE     FR 2354505 A1 * 1/1978 ............. F16M 11/10
DE        2840059 A1 * 3/1980 ............. F16M 11/14
(Continued)

OTHER PUBLICATIONS

Newman traffic signs mounting hardware, 2008, 1 page http://www.newmansigns.com/traffic_signs/accessories.php.
(Continued)

*Primary Examiner* — Eret McNichols
(74) *Attorney, Agent, or Firm* — David A. Burge

(57) ABSTRACT

Costly devices are supported atop telescopically extensible masts of theft resistant mounts well suited to be positioned at temporary, often unattended, outdoor locations. An upper component of each mast carries a torque-disconnect coupler that has two relatively turnable elements, including one fixed to the mast, and another that defines a threaded formation extending along an upstanding axis about which the elements are relatively turnable. A costly device can be tightened to the threaded formation, or can be loosened and removed therefrom—but only when an elongate key-like tool is inserted into aligned passages of the two elements to prevent turning of the threaded formation so a costly device tightened onto the formation can be threaded off of the formation. A shroud cloaks the torque-disconnect coupler and has an opening through which the tool must pass to reach the aligned passages.

22 Claims, 11 Drawing Sheets

Related U.S. Application Data a continuation-in-part of application No. 14/544,686, filed on Feb. 5, 2015, now Pat. No. 9,534,731.

(60) Provisional application No. 61/995,095, filed on Apr. 2, 2014, provisional application No. 61/965,784, filed on Feb. 8, 2014.

(51) Int. Cl.
| | |
|---|---|
| *F16B 7/10* | (2006.01) |
| *E04H 12/18* | (2006.01) |
| *E05B 73/00* | (2006.01) |
| *F16M 11/14* | (2006.01) |
| *G01C 15/00* | (2006.01) |

(52) U.S. Cl.
CPC ............. *F16B 7/105* (2013.01); *F16M 11/14* (2013.01); *F16M 13/02* (2013.01); *G01C 15/00* (2013.01); *F16M 2200/024* (2013.01)

(58) Field of Classification Search
USPC .................. 248/177.1, 178.8, 180.1, 188.1
See application file for complete search history.

(56) References Cited

U.S. PATENT DOCUMENTS

| | | | | |
|---|---|---|---|---|
| 209,562 | A * | 11/1878 | Gurley | F16M 11/14 248/181.1 |
| 687,183 | A * | 11/1901 | Kolander | F16C 11/0633 248/181.1 |
| 1,151,549 | A * | 8/1915 | Schade | F16M 11/12 248/180.1 |
| 1,288,461 | A * | 12/1918 | Akeley | F16M 11/14 248/181.1 |
| 1,443,247 | A | 1/1923 | Wrightman | 40/607.11 |
| 1,846,382 | A * | 2/1932 | Bing | F16M 11/041 248/187.1 |
| 1,894,456 | A * | 1/1933 | Zerk | F16M 11/10 248/181.1 |
| 2,408,343 | A * | 9/1946 | Rothweiler | G01C 9/28 248/180.1 |
| 2,541,434 | A * | 2/1951 | Nelson | E06C 7/14 192/105 BB |
| 2,572,468 | A * | 10/1951 | Gibson | F16M 11/14 248/181.2 |
| 2,672,313 | A * | 3/1954 | Poole | F16M 11/14 248/182.1 |
| 2,775,423 | A * | 12/1956 | Strass | G01C 1/02 235/60.2 |
| 3,021,601 | A * | 2/1962 | Hayes | E01B 35/08 248/214 |
| 3,527,435 | A * | 9/1970 | Yorkins | H01Q 1/125 248/184.1 |
| 3,737,130 | A * | 6/1973 | Shiraishi | F16M 11/048 248/181.1 |
| 3,808,851 | A * | 5/1974 | Kargus | E05B 73/0076 70/232 |
| D241,539 | S | 9/1976 | Iverson | D20/22 |
| 4,076,158 | A * | 2/1978 | Barr | B62D 43/08 224/403 |
| 4,134,222 | A | 1/1979 | Orsos | 40/606.15 |
| 4,244,547 | A * | 1/1981 | Kooi | G01D 11/30 248/180.1 |
| 4,249,832 | A * | 2/1981 | Schmanski | E01F 9/669 256/13.1 |
| 4,308,733 | A * | 1/1982 | Tampa | B62D 43/00 224/42.24 |
| 4,347,932 | A | 9/1982 | Furutu | 206/343 |
| 4,358,941 | A * | 11/1982 | Zimmer | E05B 67/36 285/80 |
| 4,423,850 | A * | 1/1984 | Bass | F16M 11/125 248/180.1 |
| 4,444,031 | A * | 4/1984 | Watson | A01K 97/06 70/232 |
| D286,166 | S | 10/1986 | Russell | D20/22 |
| 4,736,603 | A * | 4/1988 | Brushaber | E05B 73/0076 109/64 |
| 4,751,831 | A * | 6/1988 | Morris, Jr. | E05B 65/0089 70/159 |
| D306,690 | S | 3/1990 | Bison | D8/382 |
| 4,926,561 | A * | 5/1990 | Miller | G01C 15/06 33/293 |
| 4,957,317 | A * | 9/1990 | Jakubas | B65D 55/14 292/256.67 |
| 5,015,119 | A * | 5/1991 | Schmanski | E01F 7/06 256/13.1 |
| D321,914 | S | 11/1991 | Tam | D20/43 |
| 5,141,119 | A * | 8/1992 | Milazzo | B60R 25/007 212/290 |
| D330,523 | S | 10/1992 | Killion | D10/119.2 |
| D334,815 | S | 4/1993 | Bunger | D25/113 |
| 5,244,172 | A | 9/1993 | Allega | 248/161 |
| 5,249,766 | A * | 10/1993 | Vogt | F16C 11/106 248/181.1 |
| D344,764 | S | 3/1994 | Tam | D20/43 |
| D347,568 | S | 6/1994 | Siragusa et al. | D8/382 |
| D353,627 | S | 12/1994 | McCormick | D20/43 |
| D354,773 | S | 1/1995 | Koves | D19/99 |
| 5,418,609 | A * | 5/1995 | Dunne | G01C 1/02 248/162.1 |
| 5,426,963 | A * | 6/1995 | Tafoya | B62D 43/007 224/42.21 |
| 5,447,044 | A * | 9/1995 | Cheng | E05B 73/0005 248/552 |
| D369,958 | S | 5/1996 | Huang et al. | D8/387 |
| D373,074 | S | 8/1996 | Miyashita | D8/382 |
| D374,811 | S | 10/1996 | Miyashita | D8/382 |
| 5,567,939 | A * | 10/1996 | Hong | F16M 11/14 250/338.1 |
| 5,614,918 | A * | 3/1997 | Dinardo | F16M 11/02 248/181.1 |
| 5,709,051 | A | 1/1998 | Mazziotti | 52/12 |
| D393,045 | S | 3/1998 | Hsu | D20/43 |
| 5,722,268 | A * | 3/1998 | Choi | E05B 73/0082 248/553 |
| 5,749,549 | A * | 5/1998 | Ashjaee | F16M 11/08 248/168 |
| 5,760,748 | A * | 6/1998 | Beckingham | H01Q 1/125 248/177.1 |
| 5,769,370 | A * | 6/1998 | Ashjaee | F16M 11/08 248/168 |
| D400,428 | S | 11/1998 | Sabounjian | D8/382 |
| 5,878,519 | A * | 3/1999 | Huyck, Jr. | E01F 9/669 248/214 |
| 5,906,064 | A | 5/1999 | Field | 40/606 |
| D416,290 | S | 11/1999 | Poelvoorde et al. | D20/43 |
| D420,566 | S * | 2/2000 | Ely | D8/354 |
| D425,133 | S | 5/2000 | Ueno | D20/43 |
| D428,804 | S | 8/2000 | Benz et al. | D8/382 |
| 6,109,077 | A * | 8/2000 | Lee | E05B 73/0005 70/232 |
| 6,324,024 | B1 * | 11/2001 | Shirai | G01C 15/002 356/4.01 |
| 6,378,232 | B1 | 4/2002 | Creech | 40/611 |
| 6,378,818 | B1 | 4/2002 | Padiak et al. | 248/201 |
| 6,439,515 | B1 * | 8/2002 | Powers | F16M 11/28 248/129 |
| 6,619,078 | B1 | 9/2003 | Reese | 70/34 |
| D488,056 | S | 4/2004 | Dion | D8/381 |
| D491,450 | S | 6/2004 | Braun et al. | D8/382 |
| 6,813,918 | B2 | 11/2004 | Reese | 70/386 |
| D507,226 | S | 7/2005 | Oksa | D12/223 |
| D507,352 | S | 7/2005 | Vanderbrugghen | D25/42 |
| D508,572 | S | 8/2005 | Suggate | D25/134 |
| 6,951,434 | B2 * | 10/2005 | Yodock, Jr. | E01F 13/02 404/6 |
| 6,983,916 | B2 * | 1/2006 | Raynaud | F16M 11/046 248/163.2 |

(56) References Cited

U.S. PATENT DOCUMENTS

| | | | | |
|---|---|---|---|---|
| 7,069,680 B1* | 7/2006 | Crawford | G09F 7/18 | 24/502 |
| D526,588 S | 8/2006 | Johansson et al. | D10/66 | |
| D547,462 S | 7/2007 | Petta et al. | D25/122 | |
| 7,281,693 B2* | 10/2007 | Chou | F16M 11/14 | 248/179.1 |
| D559,665 S | 1/2008 | Terada et al. | D8/382 | |
| 7,320,450 B2* | 1/2008 | Carnevali | F16M 11/40 | 248/121 |
| D563,776 S | 3/2008 | Dagg | D8/382 | |
| D564,868 S | 3/2008 | Terada et al. | D8/382 | |
| D571,645 S | 6/2008 | Skoog | D8/382 | |
| 7,398,952 B2 | 7/2008 | Carnevali | 248/404 | |
| D576,026 S | 9/2008 | Mazzocco | D8/382 | |
| D576,062 S * | 9/2008 | Hayamizu | D10/66 | |
| D583,219 S | 12/2008 | Dagg | D8/349 | |
| D591,586 S | 5/2009 | Dagg | D8/382 | |
| D599,649 S | 9/2009 | Wakasugi et al. | D8/382 | |
| 7,594,633 B2 | 9/2009 | Carnevali | 248/404 | |
| D605,959 S | 12/2009 | Apotheloz | D10/66 | |
| D617,180 S | 6/2010 | VanElverdinghe | D8/382 | |
| D617,633 S | 6/2010 | VanElverdinghe | D8/382 | |
| 7,748,669 B2* | 7/2010 | Lu | F16M 11/14 | 248/181.1 |
| D623,697 S | 9/2010 | Makhija et al. | D20/41 | |
| D627,630 S | 11/2010 | Sandinge | D8/380 | |
| D631,734 S | 2/2011 | Fernandez et al. | D8/380 | |
| D638,694 S | 5/2011 | Misch | D8/380 | |
| 7,997,547 B1 | 8/2011 | Maus | 248/219.3 | |
| 8,025,262 B2* | 9/2011 | Yamaguchi | F16M 11/04 | 248/176.1 |
| 8,061,920 B2* | 11/2011 | Wimberley | F16M 11/14 | 248/181.1 |
| D650,126 S | 12/2011 | Kong et al. | D26/138 | |
| 8,104,723 B2* | 1/2012 | Parham | G01C 15/00 | 248/176.1 |
| 8,123,427 B2* | 2/2012 | Vogt | F16C 11/106 | 403/137 |
| D665,656 S | 8/2012 | Anzelmo | D8/380 | |
| D669,135 S | 10/2012 | Garfinkle | D20/43 | |
| D678,045 S | 3/2013 | Paolini | D8/382 | |
| 8,419,309 B2* | 4/2013 | Wimberley | F16M 11/14 | 248/181.2 |
| D684,068 S | 6/2013 | Ishii | D10/66 | |
| 8,537,216 B2 | 9/2013 | Guertler | 348/135 | |
| D692,498 S | 10/2013 | Valls et al. | D20/43 | |
| 8,590,190 B2 | 11/2013 | White | 40/612 | |
| D695,592 S * | 12/2013 | White | D8/354 | |
| 8,640,370 B2* | 2/2014 | Mandl | G09F 7/20 | 116/63 P |
| 8,656,947 B1 | 2/2014 | Barton | 137/544 | |
| D701,107 S | 3/2014 | White | D8/354 | |
| D703,029 S | 4/2014 | Fox | D8/373 | |
| 8,720,074 B2 | 5/2014 | Amor | 33/290 | |
| D707,545 S | 6/2014 | Schopf | D8/394 | |
| 8,747,418 B2* | 6/2014 | Qureshi | F16M 11/14 | 248/161 |
| D713,463 S | 9/2014 | Dougherty et al. | D20/43 | |
| D727,138 S | 4/2015 | Cross | D8/382 | |
| D730,719 S | 6/2015 | Sundberg | D8/354 | |
| D730,724 S | 6/2015 | Brown | D8/380 | |
| D732,380 S | 6/2015 | Chou | D8/383 | |
| D735,595 S * | 8/2015 | White | D10/74 | |
| 9,163,774 B2* | 10/2015 | Orlov | F16M 7/00 | |
| 2002/0174582 A1 | 11/2002 | Garfinkle et al. | 40/606 | |
| 2003/0051414 A1 | 3/2003 | Bessette | 52/16 | |
| 2004/0197140 A1* | 10/2004 | Maleska | E01F 15/083 | 404/6 |
| 2005/0045783 A1* | 3/2005 | Brumley | B23K 37/0452 | 248/181.1 |
| 2005/0057745 A1* | 3/2005 | Bontje | G01C 15/002 | 356/139.03 |
| 2005/0135878 A1* | 6/2005 | McNally | E01F 13/022 | 404/6 |
| 2005/0269466 A1 | 12/2005 | Conway et al. | 248/222.14 | |
| 2006/0000957 A1* | 1/2006 | Carnevali | F16M 11/14 | 248/181.1 |
| 2007/0152115 A1* | 7/2007 | Chou | F16M 11/14 | 248/181.1 |
| 2008/0006746 A1 | 1/2008 | Volochine | 248/169 | |
| 2008/0084147 A1* | 4/2008 | Brown | A47B 83/001 | 312/223.3 |
| 2008/0156947 A1* | 7/2008 | Yamaguchi | F16M 11/04 | 248/177.1 |
| 2008/0178506 A1 | 7/2008 | Garfinkle | 40/658 | |
| 2008/0307684 A1* | 12/2008 | Ulloa | G09F 7/18 | 40/607.1 |
| 2009/0178319 A1 | 7/2009 | Ulloa et al. | 40/607.1 | |
| 2009/0289161 A1 | 11/2009 | Nuttman | 248/229.1 | |
| 2010/0005690 A1* | 1/2010 | Mavis | G09F 7/22 | 40/1 |
| 2010/0012811 A1 | 1/2010 | MacKenzie et al. | 248/423 | |
| 2011/0010974 A1 | 1/2011 | White | 40/606.02 | |
| 2011/0047845 A1 | 3/2011 | Barile | 40/658 | |
| 2011/0214321 A1 | 9/2011 | White | 40/606.01 | |
| 2011/0252655 A1* | 10/2011 | Cline | G01C 15/00 | 33/228 |
| 2012/0001051 A1 | 1/2012 | Williams | 248/519 | |
| 2012/0203377 A1* | 8/2012 | Paydar | G01K 3/005 | 700/232 |
| 2012/0204454 A1* | 8/2012 | Larsen | G09F 21/04 | 40/591 |
| 2012/0285567 A1 | 11/2012 | Kessler | 137/615 | |
| 2013/0161943 A1 | 6/2013 | Bailey | 285/283 | |
| 2013/0163978 A1* | 6/2013 | Carlesso | F16C 11/106 | 396/428 |
| 2013/0265780 A1* | 10/2013 | Choksi | F21V 21/145 | 362/373 |
| 2014/0314520 A1* | 10/2014 | Friedman | F16B 37/14 | 411/367 |
| 2015/0023009 A1* | 1/2015 | White | G09F 21/04 | 362/183 |
| 2015/0292226 A1* | 10/2015 | White | F16B 7/105 | 211/4 |
| 2016/0025258 A1* | 1/2016 | Shannahan | F16M 11/2014 | 29/825 |
| 2016/0076885 A1* | 3/2016 | Nishita | G01C 15/008 | 33/292 |
| 2016/0086525 A9* | 3/2016 | White | G09F 21/04 | 362/183 |
| 2016/0312967 A1* | 10/2016 | Harvey | F21V 17/007 | |

FOREIGN PATENT DOCUMENTS

| | | | | |
|---|---|---|---|---|
| DE | 102011101110 A1 * | 11/2012 | | F16M 11/14 |
| DE | 102011110428 B3 * | 11/2012 | | F16M 11/14 |
| DE | 102013004952 A1 * | 3/2014 | | F16M 11/14 |
| DE | 102013006617 A1 * | 10/2014 | | G03B 17/561 |
| DE | 202014101908 U1 * | 9/2015 | | |
| GB | 191411712 A * | 0/1915 | | F16M 11/16 |
| GB | 666821 A * | 2/1952 | | B65D 55/14 |
| GB | 2530747 * | 4/2016 | | |
| JP | EP 1939518 A1 * | 7/2008 | | F16M 11/04 |

OTHER PUBLICATIONS

Western Safety Products Sign Mounting Hardware & Posts, 2015, 2 Pages http://www.westernsafety.com/products/safewaysigns/safewaysignpg4.html.

Safetysign.com website 180 Degree U-Channel Post Bkt, 2015, 1 page http://www,safetysign.com/products/p8863/street-name-bracket.

Grimco Inc. U Channel Post Bracket Heavy Duty St. Sign, 2015, 1 page http://www.grimco.com/Products.aspx?cid+0073&pid=00318 &sid-BA180F.

Traffic Sign Source website 180X U-channel Post Bkt, 2015, 1 page http://www.trafficsignsource.com/signhardware.htm.

* cited by examiner

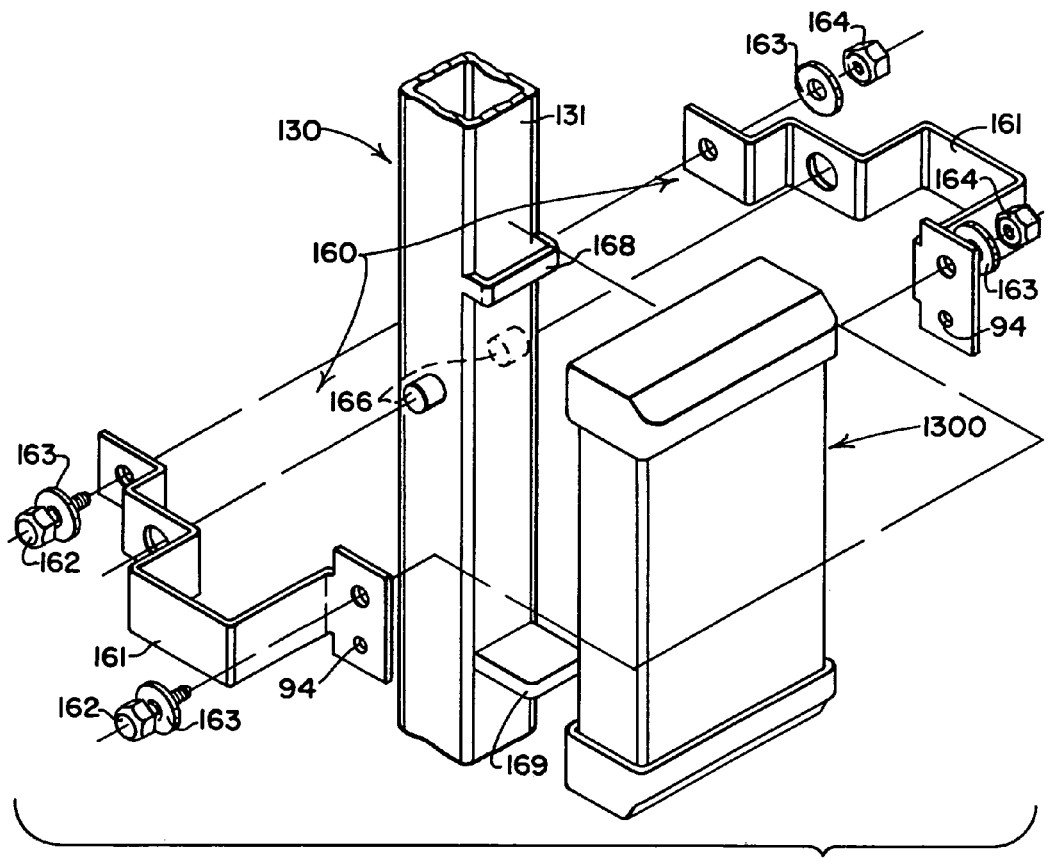
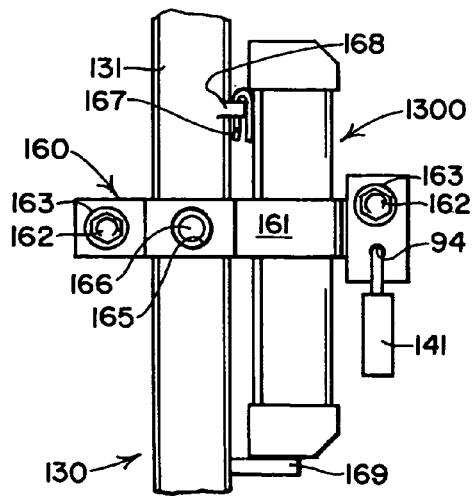
FIG. 7
FIG. 8

THEFT RESISTANT UPSTANDING MOUNT FOR TEMPORARY POSITIONING OF COSTLY EQUIPMENT AT UNATTENDED OUTDOOR LOCATIONS

REFERENCE TO PROVISIONAL APPLICATION

This application claims the benefit of the Apr. 2, 2014 filing date of Provisional Application Ser. No. 61/995,095 filed by Franklin B. White, the disclosure of which is incorporated herein by reference.

CROSS-REFERENCE TO RELATED APPLICATION

This application is a continuation-in-part of two pending applications, namely:

1) Design application Ser. No. 29/463,908 filed Apr. 2, 2014 by Franklin B. White, referred to hereinafter as the Padlockable Fastener Case, the disclosure of which is incorporated herein by reference; and, 2) Utility application Ser. No. 14/544,686 filed Feb. 5, 2015 by Franklin B. White, referred to hereinafter as the Total System Case, which claimed the benefit of the Feb. 8, 2014 filing date of Provisional Application Ser. No. 61/965, 784 filed by Franklin B. White, the disclosures of both being incorporated herein by reference.

SUBJECT-MATTER-RELATED PATENTS

1) Reference is made to Design Pat. No. D-701,107 issued Mar. 18, 2014 from Design application Ser. No. 29/395,835 filed Apr. 6, 2012 by Franklin B. White, referred to hereinafter as the Clamp-On Base Case, the disclosure of which is incorporated herein by reference.

2) Reference also is made to U.S. Pat. No. 6,619,078 issued Sep. 16, 2003 to Mark Reese, and to U.S. Pat. No. 6,813,981 issued Nov. 9, 2004 to Mark Reese, collectively referred to hereinafter as the Lockable Hitch Pin Patents, the disclosures of which are incorporated herein by reference.

BACKGROUND

The present application relates not only to a theft resistant apparatus (or "upstanding mount") intended to adjustably hold aloft expensive electronic equipment or components thereof that are referred to herein as "costly devices"), but also to a method (namely a theft resistant manner of adjustably holding costly devices and the like aloft—for example a method that makes use of the upstanding mount disclosed herein).

The background discussion that follows begins by explaining how such patent documents as are referred to herein are pertinent to each other; and by explaining what is meant by some of the terms used herein.

The Clamp-On Base Case referenced above is an issued patent that discloses a base assembly designed to clamp securely onto an upper part of a massive concrete barrier segment such as the barrier segments that are positioned end to end and commonly used to separate lanes of traffic on interstate highways and the like. A clamp-on base assembly of the general type disclosed in this issued patent can be used by the upstanding mount disclosed in the present application to enhance the theft deterrence or the theft resistance of upstanding mounts such as the one disclosed herein.

The Padlockable Fastener Case referenced above is a pending application that discloses the use of padlockable tubular collars to block access to the typically hex or square tool-engageable formations of conventional fasteners such as bolts and nuts. The upstanding mount of the present invention can use padlockable tubular collars of the general type disclosed in the Padlockable Fastener Case to enhance the theft resistance of such upstanding mounts as the one disclosed herein.

The Total System Case referenced above is an application filed a few weeks ago that, like the present application, discloses a theft-resistant upstanding mount for adjustably supporting costly devices.

The Lockable Hitch Pin Patents referenced above disclose embodiments that are typical of many similar, commercially available, lockable hitch pins that typically include a headed hitch pin component that has an elongate stem that can be locked to a key-operated retainer component that can retain the hitch pin in place after it has been inserted through aligned holes defined by a hitch and a drawbar of a tractor or the like. Lockable hitch pins are used for many purposes, and are preferably used by the upstanding mount disclosed herein to lockably couple adjacent pairs of a telescopically extensible and retractable upstanding mast assembly, to thereby enhance the theft resistance of the upstanding mount.

Torque-Disconnect Coupler is a term used herein to refer to an assembly having two concentrically extending elements that both can turn about a common axis unless and until the elements are drivingly connected.

By way of a simple example, let one of two relatively turnable elements take the form of a cylindrical shaft; and, let the other element be a same-length piece of tubing that concentrically encircles the shaft element. The elements now can each be easily turned independently of the other about an imaginary center axis that extends along the length of the shaft element at a location in the middle of the shaft element. Add plastic caps on opposite ends of the tubular element thereby preventing the two relatively turnable elements from moving axially relative to each other. Now, drill a hole through a side wall of the tubular element, with the hole extending onward into the shaft element at least as far as the imaginary center axis. The two concentric elements can still turn freely relative to each other—except that, if you stick a pencil into the drilled hole, the pencil drivingly connects the two elements. Applying turning force or "torque" to either element will cause both elements to turn in unison because the elements are drivingly connected or "torque connected." Removal of the inserted pencil returns the elements to a normally "torque disconnected" state, meaning that turning either element, or preventing either from turning, will have no influence on whether the other element turns, or cannot turn. Such is the nature of a so-called "torque-disconnect coupler."

Costly Devices is another term used herein. In one respect, this term is intended to refer, in general, to costly electronic equipment (and components thereof)—such as is disclosed in the present application, and the Total System Case. However, this term also is intended to broadly include other types of costly equipment, apparatus or devices that may need to be supported at selected above-ground heights, or held aloft by ground-engageable upstanding mounts.

Both the Total System Case and the present application disclose upstanding mounts that have telescopically extensible masts intended to hold costly devices aloft at selected above-ground heights. Each of the upstanding mounts disclosed in the Total System Case and in the present application call for a bearing to be interposed between the extensible mast of the mount, and such costly device as may be carried by the mount. Both of the upstanding mounts gain a degree of theft resistance, or may be said to be more theft deterrent, due to the presence of the bearing. However, the upstanding mounts disclosed in these two applications differ in that, whereas the upstanding mount of the Total System Case is preferably supplied with a costly spherical type of bearing (to perform a leveling function), the upstanding mount of the present invention can use a variety of types of bearings.

Both types of costly devices (i.e., one type is shown in the Total System Case, and another in the present application) have several similarities. Both are held aloft (i.e., at selected above-ground heights) so that the costly devices can send control signals (or data and other information) to electronic control units carried on heavy mobile machinery such as bulldozers and road graders operating within a few miles of the temporary installation sites of the upstanding mounts. Both types are similar in that they are well-built, compact and lightweight products of such entities as Trimble Navigation Limited of Sunnyvale, Calif.—and, yet, these costly devices are delicate and need to be securely supported so they are not whipped about by high wind during inclement weather, nor are they damaged if the costly devices continue to be held aloft by upstanding mounts during times when the upstanding mounts are being lifted and moved by bulldozers (or similar heavy mobile equipment) from one temporary installation site to another.

The temporary installation sites where the upstanding mounts are stationed need to be carefully chosen. Such sites need to be out of the way of the operation of heavy excavation machinery and the like—and need to be stationed away from trees and other tall plants, sizable items of earthwork, man-made structures and the like—so that line-of-sight satellite signals can be received without interruption, and so that line-of-sight radio signals can be sent to and/or received from the heavy mobile excavation machinery without interruption.

Usually the chosen installation sites are on high ground, in clearings where the upstanding mounts are spaced well away from trees, man-made structures and the like—whereby the distinctively configured antennas and other held-aloft components often are visible for miles, and are easily recognized. Thieves who may be looking for these installation sites usually have little difficulty finding them.

As the reader can undoubtedly appreciate, the complex electronic equipment that is supported on upstanding mounts in clearings and on high ground frequently carries a price tag of twenty thousand dollars or more—and such costly devices have become choice targets of thieves. Thieves have learned that stolen equipment of this type usually can be sold profitably and with relative ease—for example to construction contractors who may have recently experienced a theft of such equipment, and who may be under pressure (and even somewhat desperate) to get expensive excavation machinery back into service, even if the machinery will be controlled by replacement electronic equipment obtained from those who perhaps have "acquired it" from other construction sites.

As is explained in the referenced Total System Case, the type of costly devices disclosed in that pending application have come to be stolen with such unbelievable regularity that one Florida contractor actually had seven installations of these costly devices stolen during a single workday from construction sites where the costly devices were in active use when the thefts took place. Even though measures obviously have needed to be taken to render installations of such costly devices more resistant to theft, about all that was being done to deter theft (at times prior to the introduction of such upstanding mounts as are disclosed in the referenced Total System Case) was to secure costly devices using lockable tether cables—cables that, unfortunately, have proved to be severable quickly and with relative ease by the use of bolt cutters or other portable cutting equipment.

At least some of the blame (for the ease with which costly devices have been stolen) is attributable to the out-of-the-way installation sites that often go unattended for many hours at a time—sites that are easily found by thieves who watch for the distinctive appearance of satellite and radio antennas, and other components of the costly devices that are held prominently aloft by upstanding supports stationed in clearings, often on high ground, and spaced well away from trees and buildings.

At least some of the blame (for the ease with which costly devices have been stolen) is also attributable to the simplistic and jerry-rigged nature of the upstanding mounts that have commonly been used to support the costly devices. Still in current-day use are simplistic mounts that use nothing more than a tall 4×4 wooden post (sometimes steadied by a few thin guy wires), with the lower end of the 4×4 post extending into a relatively shallow hole in the soil at an installation site where a costly device is to be held aloft on a temporary basis that may last only a few days before the costly device is moved to a new out-of-the-way installation site.

At least some of the blame (for the ease with which costly devices have been stolen) is further attributable to the simple manner in which antennas and other components of the costly devices are connected to the 4×4 wooden posts described just above. Antennas and other components that may need be held aloft are usually simply threaded onto an upstanding ⅝ inch diameter threaded stud that is connected to the top of the post—in much the same manner that present-day camera equipment is tightened onto the small diameter upstanding threaded stud of a tripod. The antennas and other costly components that are threaded onto the upstanding studs are simply loosened and unscrewed from the studs to effect their removal. Other components of the costly devices such base station electronic units (that do not need to be held aloft) are typically hung from one or more hooks attached to side surfaces of the 4×4 post, or, even more simply, are laid atop an overturned wooden crate together with a lead-acid battery that powers the equipment installation.

What all of this boils down to is the simple fact that there is hardly a sizable earthwork contractor in business today who has not had one or more installations of such costly devices as are disclosed either in the Total System Case or in the present application stolen—often from job sites where the costly devices were being actively used at the times of theft.

Accordingly, a pressing need very definitely exists for an improved upstanding mount that can be lifted and moved by a bull dozer or the like from one temporary out-of-the-way installation site to another, and that can be relied on to provide superior theft resistant support at selected above-ground heights for costly devices and components thereof—especially at temporary out-of-the-way locations that often are left unattended.

SUMMARY OF THE INVENTION

The present invention addresses the need to enhance the theft resistance of upstanding mounts that hold costly devices aloft or above ground—by providing upstanding mounts that truly are capable of reliably and securely supporting costly devices at a selection of above ground heights, with good stability, at temporary outdoor locations that often are left unattended.

In some embodiments the theft resistance of upstanding mounts is enhanced by providing the mounts with telescopically extensible masts formed from lockably connected elongate components designed to effectively resist disassembly attacks. The masts extend upwardly from base assembly brackets designed to be clamped quite securely to massive and difficult-to-carry concrete barrier segments (known as k-rails). Tool-engageable fastener formations are shrouded by padlockable collars that prevent fasteners from being removed or loosened so components can be disassembled.

In some embodiments, torque-disconnect couplers are provided that connect costly devices to the mounts. The torque-disconnect couplers have relatively movable elements that define threaded formations onto which costly devices are tightened. To loosen and remove the costly devices from the threaded formations, the normally free-turning elements must be prevented from turning by the use of suitably configured tools inserted into alignable passages of the normally free-turning elements that must be turned appropriately before the tools can be inserted into passages of the free-turning elements.

In some embodiments, shrouds cloak such torque-disconnect couplers as are used to connect costly devices to upstanding masts of the mounts. The shrouds are free to turn, and define passages through which tools must be inserted even before the tools can be used to manipulate the torque-disconnect coupler elements.

In some embodiments, the theft-resistant nature of upstanding mounts is enhanced by the use of lockable hitch pins that prevent relatively movable components from moving. End regions of the lockable hitch pins, and tool-engageable fastener formations of fasteners are enclosed by padlockable collars that restrict access to the fasteners.

Other aspects of the present invention reside in theft deterrent and theft resistant methods that are disclosed herein that preferably make use of such upstanding mount features as are disclosed herein.

BRIEF DESCRIPTION OF THE DRAWINGS

Other features and advantages of such upstanding mounts as are disclosed herein will become apparent from the description and claims that follow, taken together with the accompanying drawings, wherein:

FIG. 7 is an exploded perspective view showing a pair of symmetrically configured strap brackets together with conventional fastener components that preferably are used to assist in retaining the strap brackets in place when the strap brackets perimetrically embrace a portion of the mast and a central region of a base station control box component of the costly device to retain the base station control box component on the upstanding mast;

FIG. 8 is a front view of the assembled components shown in FIG. 7, with the base station control box component of the costly device supported on the depicted mast component, and with the strap brackets embracing a central region of the base station control box and a portion of the depicted mast component, and being securely locked together by the depicted padlock;

DETAILED DESCRIPTION

Figure 1:
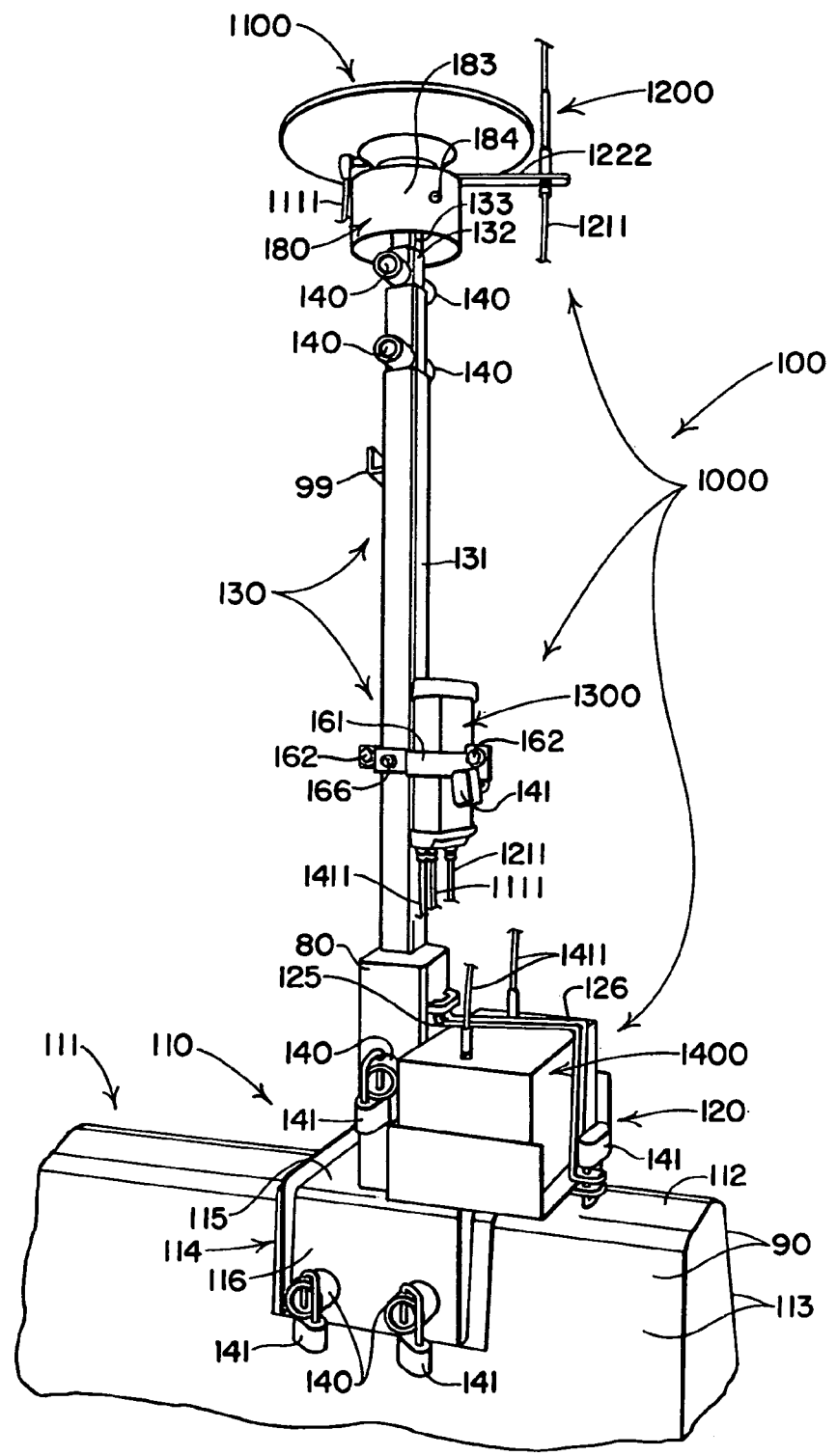
FIG. 1 is a perspective view of an upstanding mount embodying features of the present invention, with a telescopically extensible mast of the mount in a retracted or lowered position, with antenna components (of a costly device supported by the mount) shown atop a cylindrical shroud or guard positioned atop the mast, with other costly device components shown locked to lower components of the mast, with a base assembly shown lockably clamped to a massive concrete barrier segment, and with tubular collars shrouding tool-engageable fastener formations.
Figure 2:
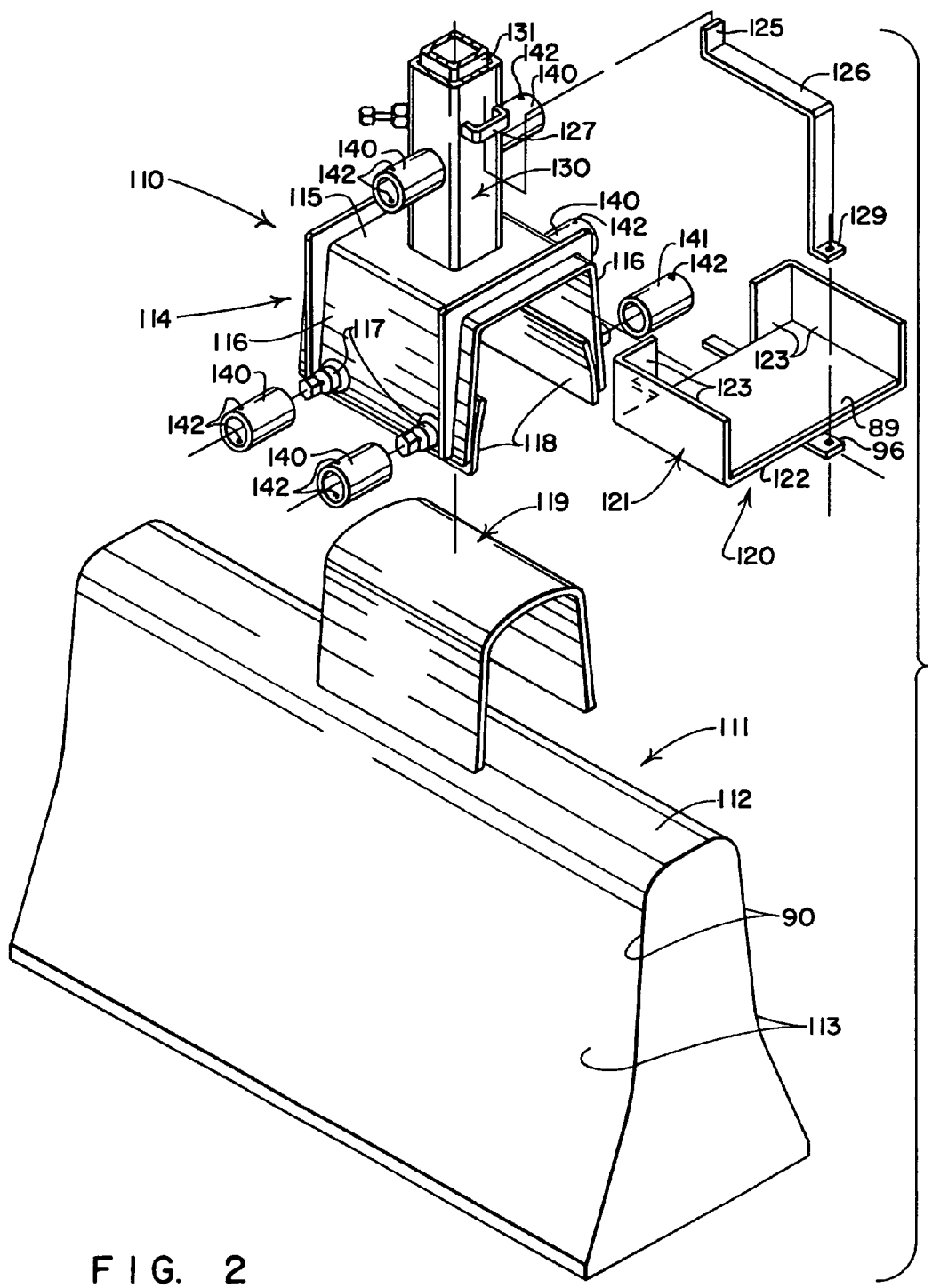
FIG. 2 is an exploded perspective view showing preferred components of a base region of the upstanding mount, with the view also showing a battery box, and showing the tubular collars that preferably are fixed to selected base and mast components of the upstanding mount having no padlocks installed thereon.

Referring to FIGS. 1 and 2, an upstanding mount that embodies features of a preferred practice of the present invention is indicated generally by the numeral 100. The upstanding mount 100 is intended to support any of a wide variety of so-called "costly devices"—with at least some components of a costly device positioned at a selection of above-ground or held-aloft heights.

By way of an example, in FIG. 1, components 1100 and 1200 of a costly device 1000 are shown as being supported atop an upstanding mast 130 of the upstanding support 100. Other components 1300 and 1400 of the costly device 100 are shown as being locked to lower regions of the upstanding support 100.

Those who are skilled in the art are quite likely to recognize the distinctive appearance of the component 1100 as being a Global Positioning Satellite (GPS) antenna; and, are quite likely to recognize the component 1200 as being a conventional radio signal transmission and reception antenna. The depicted component 1300 is a compact electronic unit—in this case, a base station control unit that is designed to receive GPS signals from the antenna 1100, and to transmit and receive radio signals to and from the antenna 1200. The antennas 1100, 1200 and base station control unit 1300 constitute costly electronic equipment sold by such entities as Trimble Navigation Limited of Sunnyvale, Calif. that is designed to send various types of data and information to electronic units carried on heavy mobile excavation equipment (not shown) such as bulldozers, road graders and the like, to assist in guiding and controlling their operation in accordance with a predetermined excavation plan for a large building construction site, interstate highway site, or the like, where the mobile equipment is operated.

Figure 3:
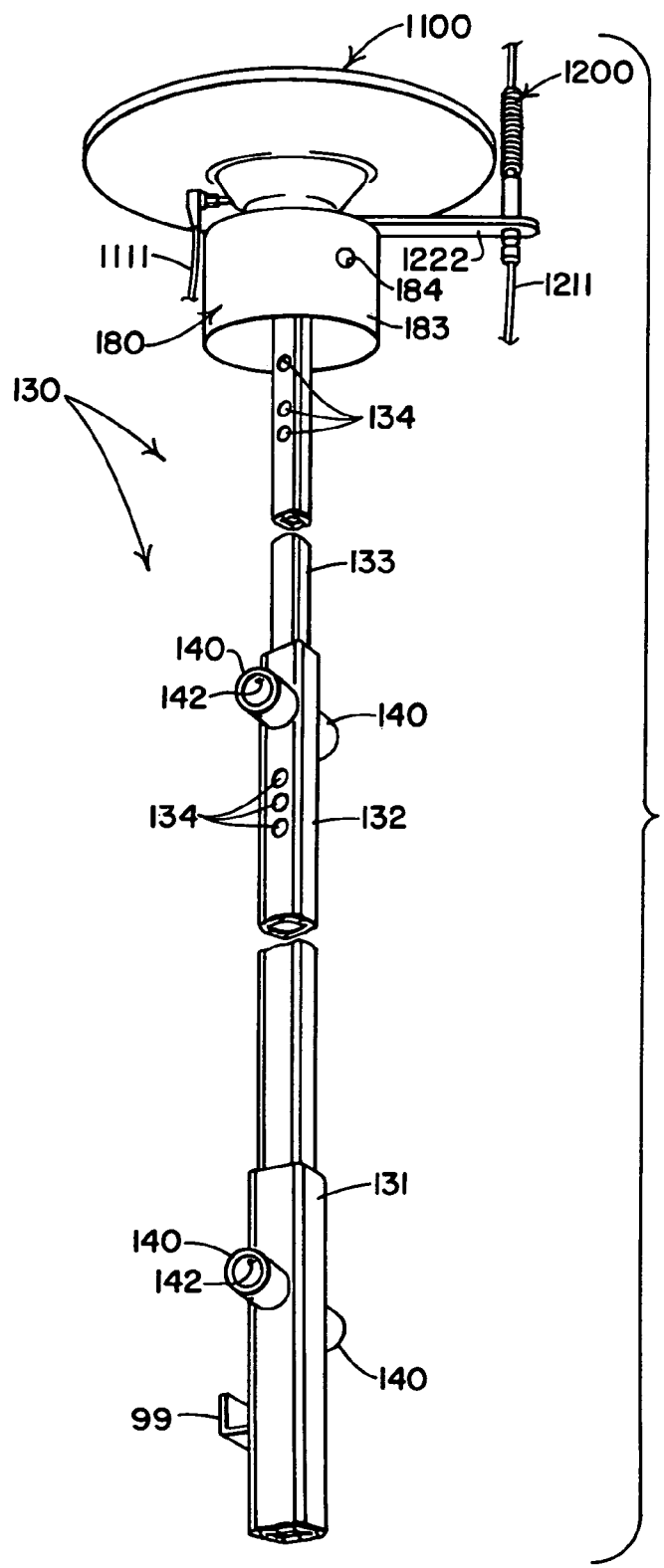
FIG. 3 is a perspective view showing three elongate components of the telescopically extensible mast of the upstanding mount in an extended or raised position, with the view showing the antenna components positioned atop the cylindrical shroud, and showing a mast-carried hook that is fixed to the lowermost of the three depicted mast components.
Figure 4:
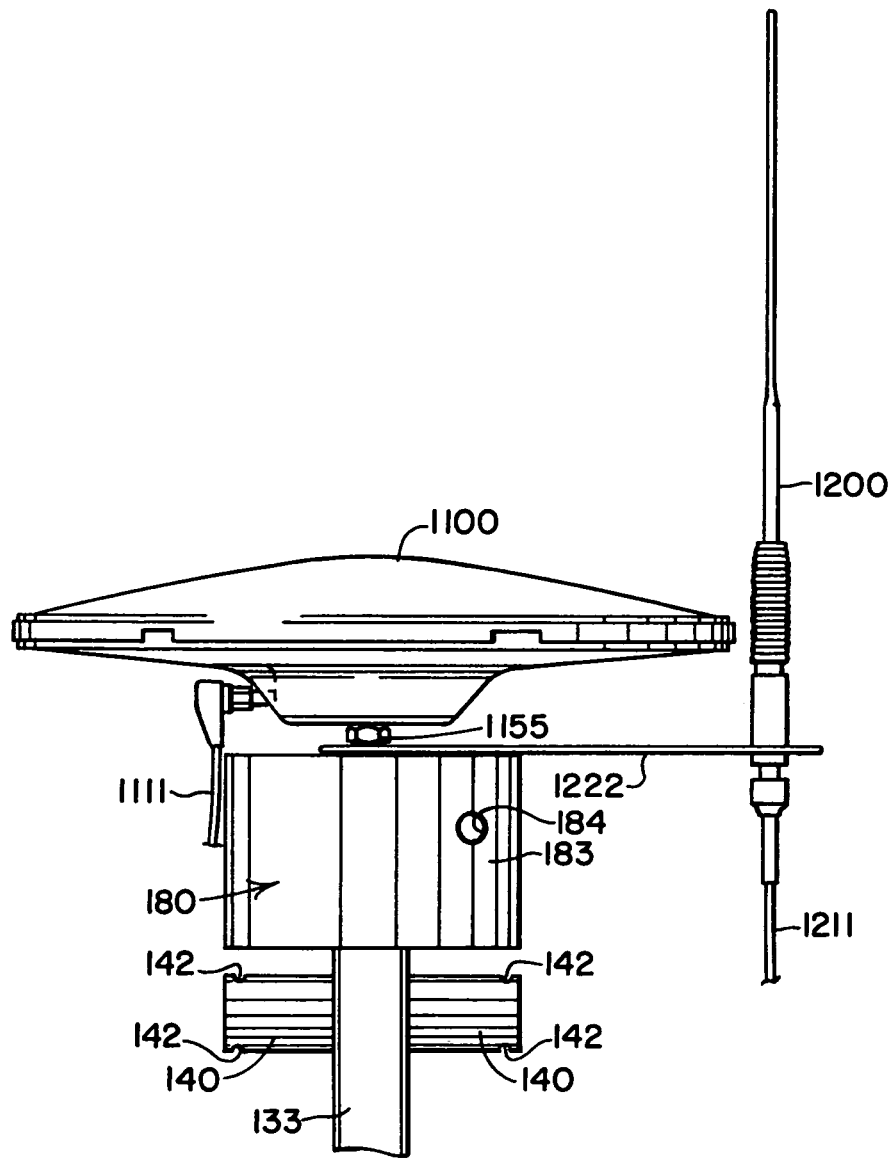
FIG. 4 is a front view showing part of the uppermost component of the elongate mast, the cylindrical shroud, and the antenna components that are carried atop the shroud, with a pair of the tubular collars being shown fixed to opposite sides of two of the mast components.

Some of the end regions 1111 and 1211 of coaxial cables (central portions of which are not shown) that connect the antennas 1100 and 1200 to the base station control unit 1300 are shown in FIGS. 1 and 4. A hook 99 (shown in FIGS. 1 and 3) is provided on one side of the mast 130 to support coils of such the center regions of such lengthy coaxial cables as are needed to connect the antennas 1100, 1200 with the base station control unit 1300 when the mast 130 is telescopically raised in the manner shown in FIG. 3.

The component 1400 of the costly device 1000 that is supported by the upstanding mount 100 near where a massive concrete barrier 111 at its top surface 112, is a lead-acid battery—in this case, a relatively costly deep cycle marine battery, which can be purchased commercially from most suppliers of vehicle batteries throughout the United States and elsewhere in the world. End regions 1411 of power cables (central regions of which are not shown) that connect the battery 1400 to the base station control unit 1300 are shown in FIG. 1.

Figure 5:
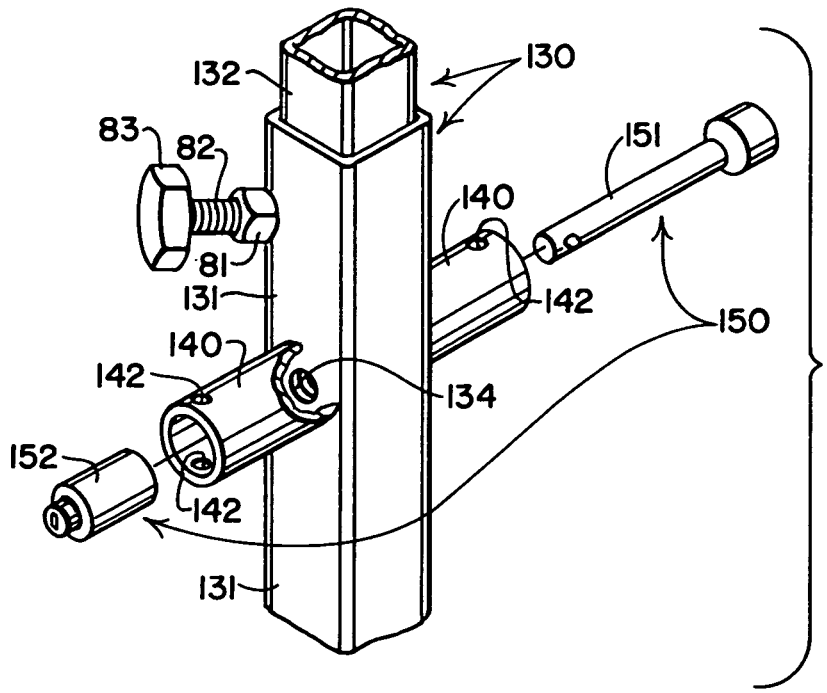
FIG. 5 is a perspective view showing portions of two of the telescopically connected mast components, with the outer of the two depicted mast components having a pair of tubular collars fixed to opposite sides thereof, with one of the collars being partially broken away to show aligned holes formed through portions of two of the depicted mast components, and with the view showing components of a commercially available lockable hitch pin that is insertable through aligned holes of the depicted mast components, with enlarged end portions of the lockable hitch pin being insertable into the depicted tubular collars.
Figure 9:
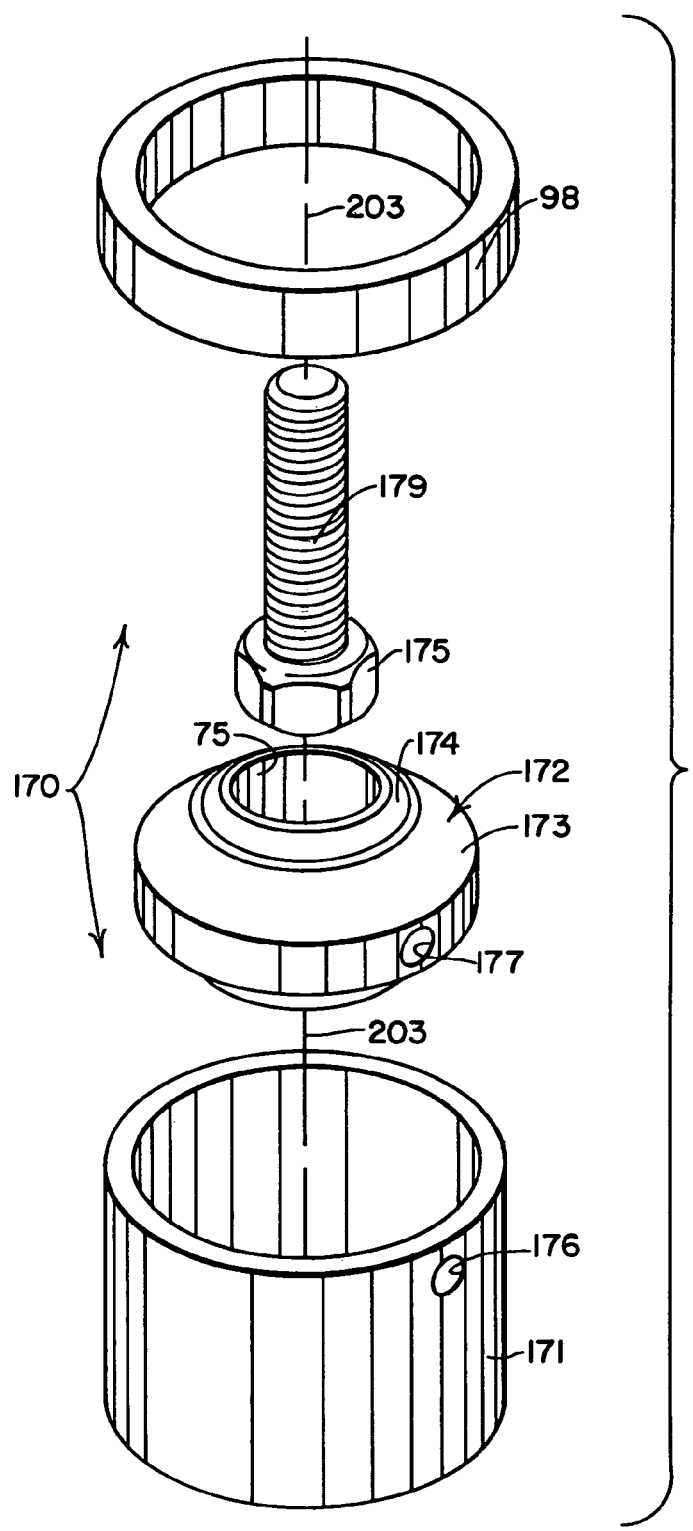
FIG. 9 is an exploded perspective view that depicts disassembled components of a combination bearing and torque-disconnect coupler, including a commercially available bearing that has been drilled to provide aligned passages extending through one side of the outer and inner parts of the bearing.
Figure 10:
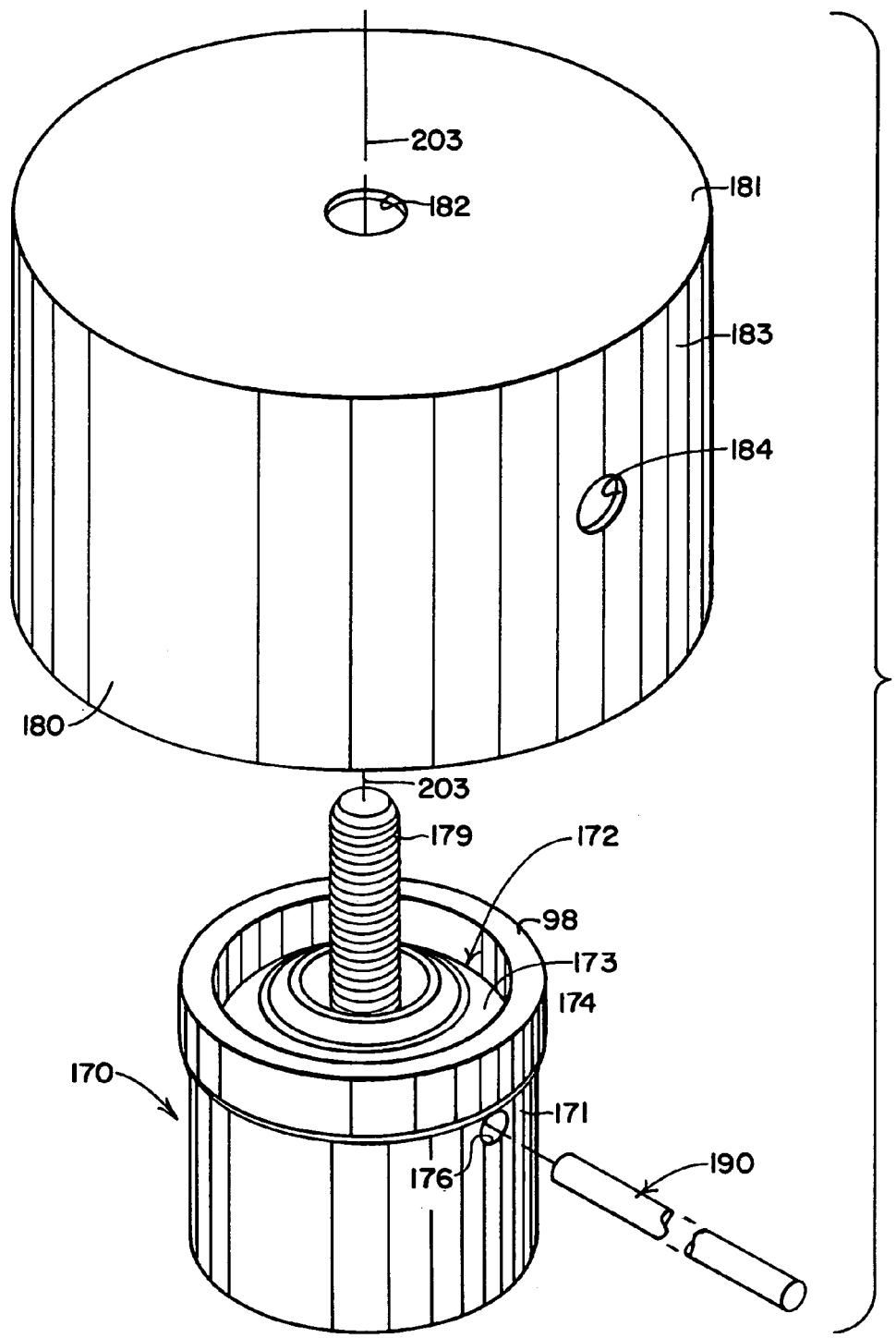
FIG. 10 is an exploded perspective view that shows the cylindrical shroud together with assembled components of the combination bearing and torque-disconnect coupler that are shown in FIG. 9, with the view also showing a foreshortened rod-like elongate tool that can be used with the torque-disconnect coupler.
Figure 11:
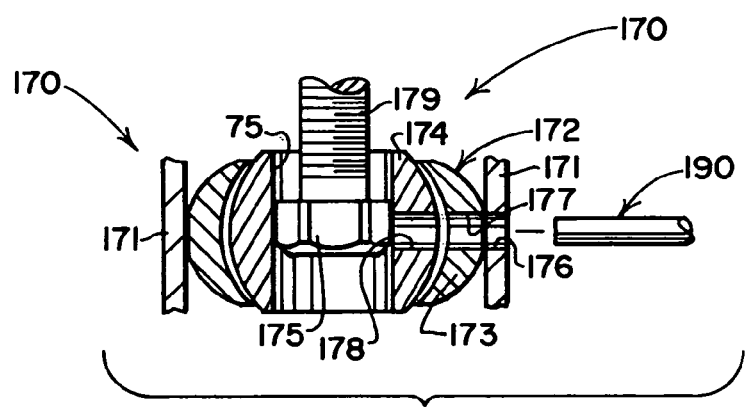
FIG. 11 is a cross-sectional view, on an enlarged scale, showing portions of the combined bearing and torque-disconnect coupler that is shown disassembled in FIG. 9, and assembled in FIG. 10, with the view also showing a portion of the rod-like elongate tool and a portion of the cylindrical shroud.
Figure 15:
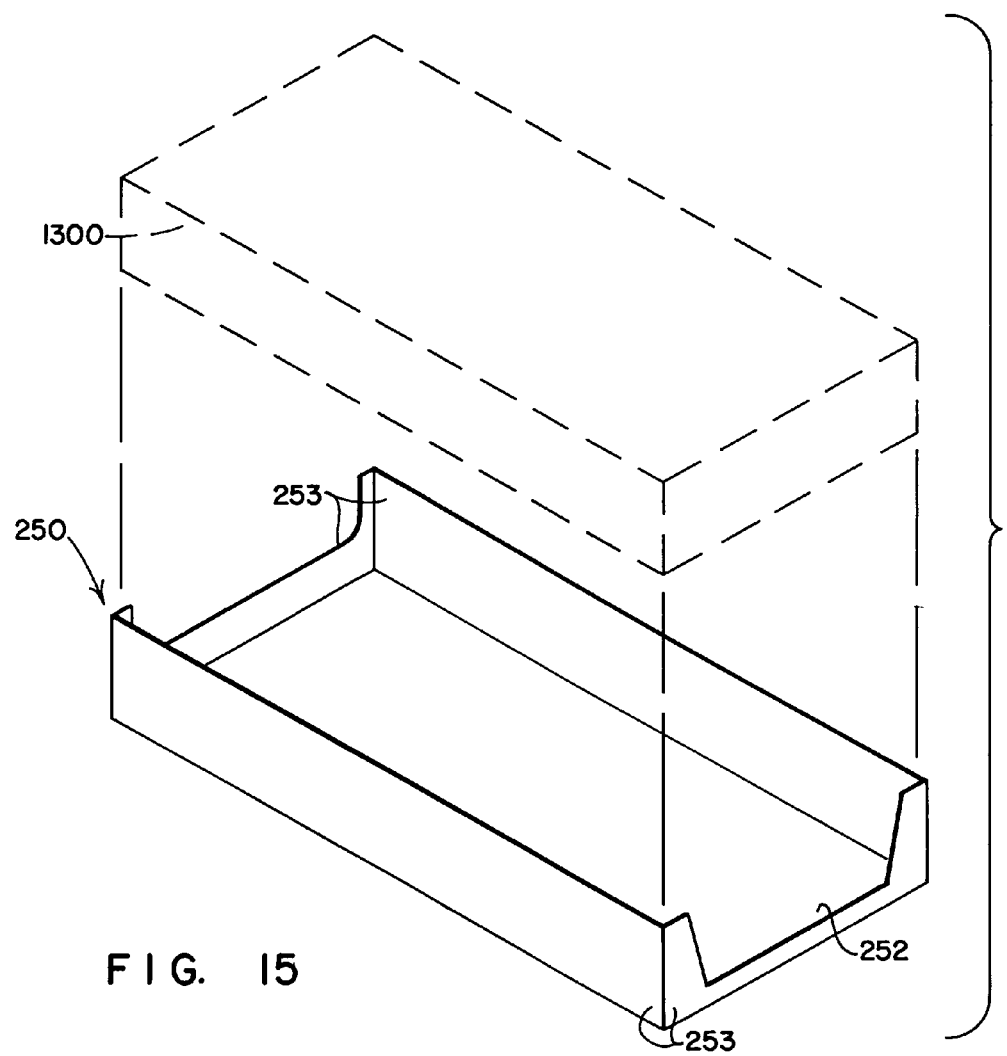
FIG. 15 is an exploded perspective view that shows a substantially horizontally extending mount that can be used in place of, or in addition to the set of strap-brackets shown in FIGS. 7 and 8 to support the base station control box shown in solid lines in FIGS. 7 and 8, and in box-like form by broken lines in FIGS. 15 and 16; and, FIG. 16 is a side view of the mount of FIG. 15 having a padlocked strap-bracket that retains the depicted base station control box.
Figure 16:
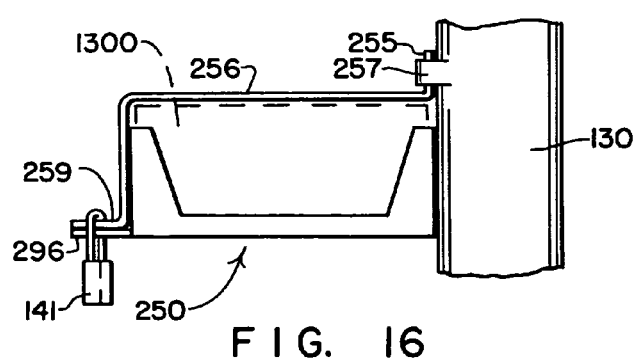

The upstanding mount 100 includes such main components as: a base assembly 110 (preferred components of which are best shown in FIG. 2); a battery box 120 (that supports and contains the battery component 1400 is best shown in FIG. 2); a telescopically extensible mast 130 (major components of which are best shown in FIG. 3); padlockable tubular collars 140 that are the subject of the referenced Padlockable Fastener Case (are shown in FIGS. 1-6); a commercially purchased lockable hitch pin assembly 150 that is the subject of the referenced Locking Hitch Pin Patents (components of which are shown in FIG. 5); a set of components 160 that are used to lock the base station control box component 1300 to the upstanding mast 130 are best shown in FIGS. 7-8; a combination bearing and torque-disconnect coupler assembly 170 (component parts of which are shown in FIG. 9, with the assembled device being shown in FIG. 10, and in cross-section in FIG. 11); a generally cylindrical shroud 180 (best shown in FIG. 6); and, an elongate rod-like tool 190 (shown foreshortened in FIGS. 10-11). FIGS. 15 and 16 show a horizontal mount 250 that can be used in place of, or in addition to the mount shown in FIGS. 8 and 9, as needed.

Figure 12:
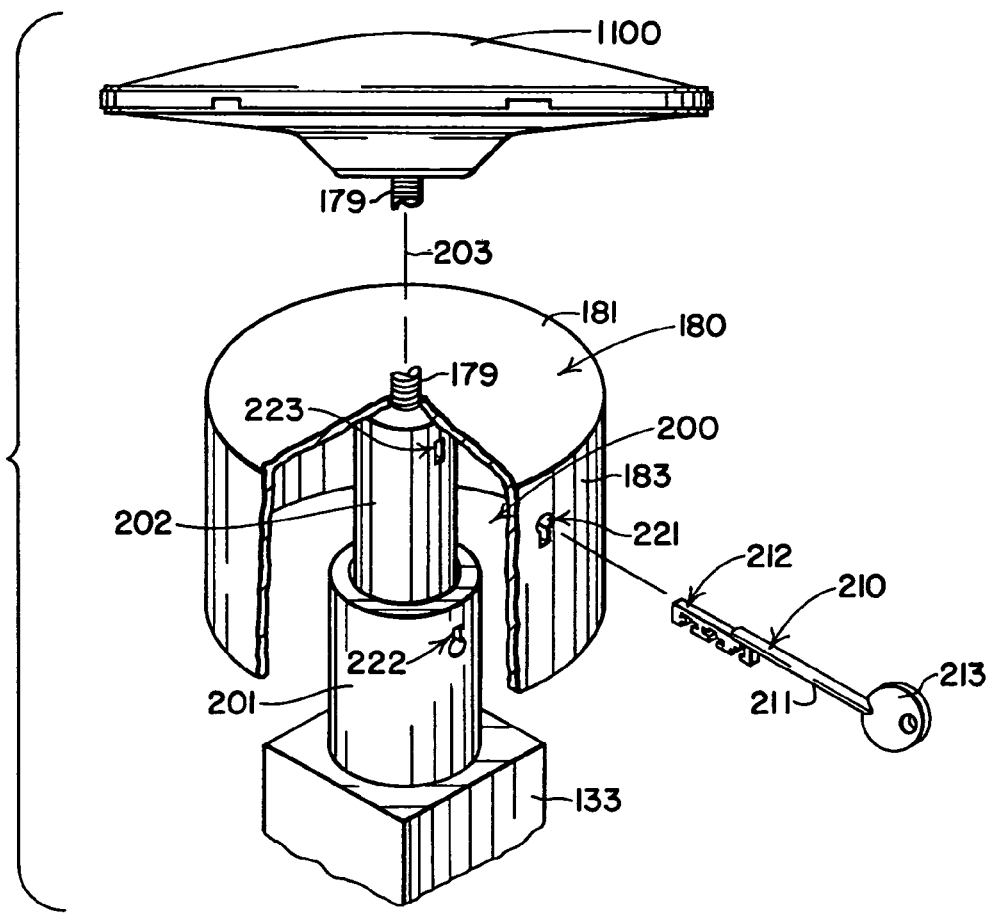
FIG. 12 is a simulated depiction that is provided merely to illustrate one of many ways in which a more complexly configured key-like elongate tool can be used with even quite a simple torque-disconnect coupler, with the depicted coupler having outer and inner components that extend concentrically along a common upstanding axis, with a cylindrical inner component of the coupler being partially raised from within a tubular outer component of the coupler, with the view also showing a portion of an uppermost component of a mast (to which the tubular outer component is fixed), a foreshortened threaded formation (to which the cylindrical inner component is fixed), the cylindrical shroud (also shown in FIGS. 1, 3, 4 and 10), a GPS antenna (which is threaded onto an upper end region of the threaded formation), and with differently configured radially extending passages being shown that are defined by the shroud, by the outer component, and by the inner component, into which differently configured passages the depicted complexly configured, key-like, elongate tool can extend.
Figure 13:
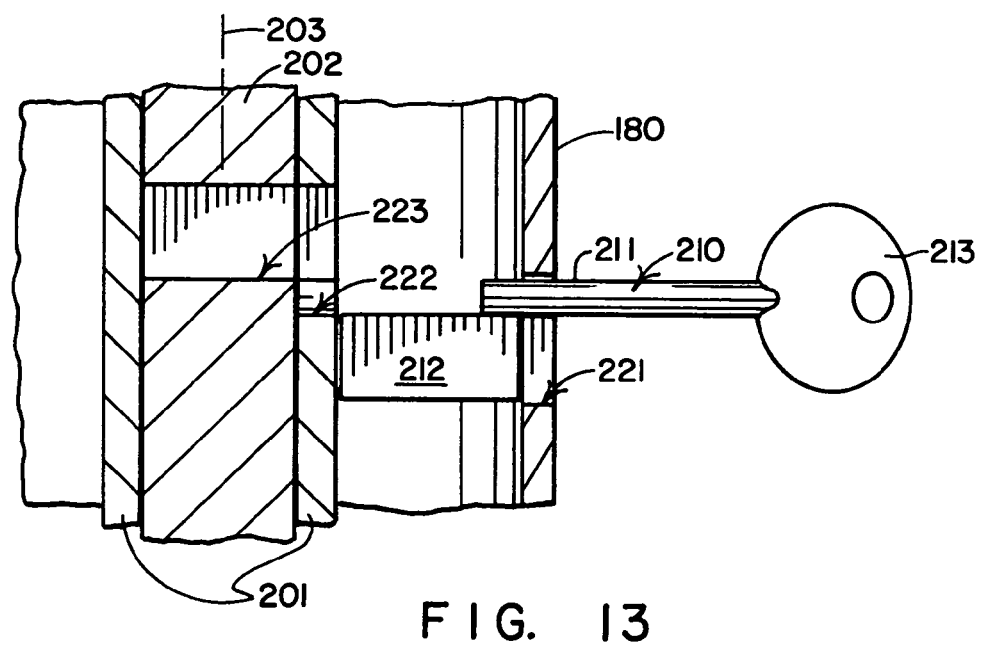
FIG. 13 is a simulated cross-sectional depiction, on an enlarged scale, of portions of the simple type of torque-disconnect coupler shown in FIG. 12, with the cylindrical inner element shown as being closely surrounded by the relatively turnable tubular outer element, with the view showing only a portion of the cylindrical shroud, and with the view showing a somewhat simpler form of key-like elongate tool that has been inserted sufficiently far into and through the passage defined by the sidewall of the shroud so that a rectangular portion of the key-like elongate tool engages a side wall of the tubular outer component of the torque-disconnect coupler.
Figure 14:
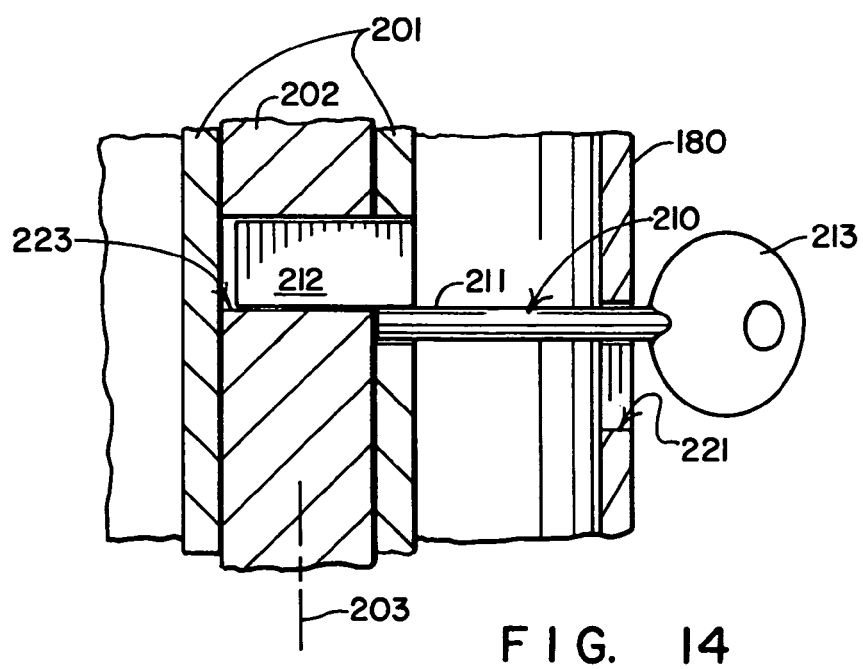
FIG. 14 is a simulated cross-sectional depiction similar to FIG. 13, but showing the key-like elongate tool of FIG. 13 after the tool has been turned a half revolution about the axis of the stem of the key-like elongate tool, and then has been inserted farther into the three differently configured passages so that the rectangular portion of the inserted key-like tool serves to "torque connect" the inner and outer components of the torque-disconnect coupler—so that neither of the inner and outer elements can turn relative to each other, nor can either turn relative to the depicted mast portion (because the tubular outer component is fixed to the depicted mast portion)

As will be explained later herein, FIGS. 12-14 are provided merely to schematically show how even an extremely simply configured torque-disconnect coupler 200 (consisting of nothing more than a cylindrical, shaft-like inner element 202 that can turn within a tubular outer element 201) can have its two relatively turnable elements 201, 202 "torque connected" and "torque disconnected" by using one of an almost unlimited number of elongate tools that are more complexly configured than the simple rod-like elongate tool 190 shown in FIGS. 10 and 11. For example, elongate tools 210 (shown in FIGS. 12-14) that have a key-like appearance can be inserted into or removed from differently configured passages 221, 222, 223 to "torque-connect" and "torque-disconnect" the relatively turnable elements 201, 202, as will be explained later herein.

As will become clear from the description that follows: 1) the major components enumerated above are assembled to provide an upstanding mount 100 that is well suited to securely support components of a costly device (such as the components 1100, 1200, 1300, 1400 of the costly device 1000); 2) the weight of the barrier segment 111 (taken together with the weight of various other relatively heavy components of the upstanding mount 100) enhances the stability of the upstanding mount 100 by compacting soil extending beneath where the massive concrete barrier segment 111 (with the upstanding mount 100 connected thereto) may be positioned, even on a temporary basis); 3) the weight, size and unwieldier configuration of the barrier segment 111 and other components of the mount 100 are factors that effectively to deter would-be "snatch and grab" thieves; 4) the many lock-together components of the base and mast assemblies 110, 130 combine with shroud and collar protections to deter disassembly attacks as an approach to acquiring possession of the components 1100, 1200, 1300, 1400 of the costly device 1000 (or such other costly devices or components thereof as may be supported by the mount 100; 5) the novel assemblies 170 that provide combined bearing and torque-disconnect coupler components provides an extremely secure method of locking costly devices and components thereof atop threaded formations 179 onto which the costly devices or components thereof are mounted—all of which renders the upstanding mount 100 clearly capable of adjustably supporting costly devices and/or components thereof at a selection of above ground heights, with good stability, and in a superior tamper-resistant, disassembly-resistant and theft-resistant manner, even when the upstanding mount 100 is stationed at temporary outdoor sites that often are left unattended.

Referring to FIGS. 1 and 2 the base assembly 110 is preferably assembled from components that include (or are connectable to) the depicted, relatively massive upstanding concrete barrier segment or k-rail 111, and a saddle-shaped support assembly 114. The massive barrier segment (or k-rail) 111 is typically three feet or more in height, may be several feet in length, and preferably weighs at least a thousand pounds. Accordingly, the barrier segment 111 is extremely difficult, if not impossible, to be manually carried—hence, the barrier segment 111 (often with other depicted components of the upstanding mount 100 still attached thereto) is almost always moved from place to place by lifting the barrier segment 111 (by a chain attached thereto) and transporting the barrier segment 111 by use of a bulldozer or such other combustion-engine-powered mobile equipment as is commonly found at sizeable construction sites.

The heavy nature of the barrier segment 111 (together with other heavy components of the upstanding mount 100) enables the usually relatively flat bottom surface of the barrier segment 111 to compress, and often to thereby stabilize such disturbed soil as may underlie the massive barrier segment 111 where it is temporarily positioned to support the costly device 1000 at a sequence of typically out-of-the-way locations.

The massive concrete barrier segment 111 shown in FIG. 2 (but only partially shown in FIG. 1) is of a type that is commonly positioned end-to-end with other similarly configured concrete barrier segments of various lengths, and used throughout the United States for such purposes as providing divider walls that separate traffic lanes of interstate highways and other busily traveled roadways. The barrier segment 111 has a top surface 112, and has opposed sidewalls 113 that incline away from each other as the sidewalls 113 depend progressively farther away from the top surface 112. Substantially flat portions 90 of the sidewalls 113 that are located relatively near to the top surface 112 do not diverge (as they extend downwardly) nearly as much as do lower portions of the sidewalls 113 located farther from the top surface 112.

Also shown in FIG. 2 is a saddle-shaped base support assembly 114 such as is disclosed more completely in the referenced referenced Clamp-On Base Case. The saddle shape of the support assembly 114 enables it to be positioned atop an upper region of the massive barrier segment 111. A top wall 115 of the saddle-shaped support assembly 114 is integrally connected to a pair of side members 116 or side assemblies 116 that depend in spaced relationship so as to extend along associated upper parts of the opposed sidewalls 113 of the barrier segment 111. Each of the depending side assemblies 116 is provided with at least two threaded fasteners 117 (two of which can be seen in FIG. 2) that can be turned to move relatively movable components 118 of the depending side assemblies 116 toward and away from associated ones of the opposed sidewalls 113 of the barrier segment 111—to securely clamp the support assembly 114 onto, or to loosen and remove the support assembly 114 from the massive barrier segment 111.

Also shown in FIG. 2 is an inverted U-shaped vibration dampening member 119 that preferably is formed from relatively stiff but still resilient plastics material. The stiff but resilient member 119 can be positioned in a saddle-like manner to overlie an upper part of the barrier segment 111; and, the saddle-shaped support assembly 114 can then be positioned in a saddle-like manner atop the stiff but resilient member 119. Thereafter, the threaded fasteners 117 are turned to clamp the relatively movable components 118 toward each other, with adjacent parts of the stiff but resilient member 119 clamped tightly against the opposed sidewalls 113 of the concrete barrier segment 111, so the saddle-shaped support assembly 114 is quite securely clamped to the massive upstanding barrier segment 111.

The stiff but resilient nature of the inverted U-shaped member 119 advantageously serves to dampen vibrations of the concrete barrier segment 111 that may result from the nearby operation of bulldozers, road graders and the like, so the upstanding mount 100 is not shaken by the nearby operation of heavy, sizeable excavation equipment and the like—which enables the upstanding mount 100 to continue to provide stable support to the costly device 1000 carried atop the upstanding mount 100 despite the nearby operation of heavy, mobile equipment. Actually, the effective manner in which the resilient U-shaped member has been found to isolate upwardly extending components of the upstanding support 100 from the barrier segment 111 has been found to be rather important in providing for proper operation of some of the costly devices that are, from time to time, supported by the upstanding mount 100.

Although the provision of stiff but resilient material is shown in FIG. 2 as being provided by a single inverted U-shaped member 119, it also is possible to use smaller, typically rectangular, pieces of stiff but resilient material (not shown) that are appropriately sized to be interposed between the movable components 118 and associated parts of the sidewalls 113 of the barrier segment 111. Additionally, an appropriately configured piece or pieces (not shown) of stiff but resilient material can be interposed between other parts of the saddle-shaped support assembly 114 and adjacent portions of the concrete barrier segment 111 (such as the top surface 112 of the barrier segment 111 and the top wall 115 of the support bracket assembly 114) to further aid in dampening vibrations that might otherwise be transmitted from the barrier segment 111 to the saddle-shaped support assembly 114.

Referring mainly to FIG. 2, the battery box 120 includes a battery support bracket 121 having an upwardly-facing floor 122 of such size as will fully underlie and support the deep-cycle marine battery component 1400 (shown in FIG. 1) of the costly device 1000. An acid-absorbent mat or pad 89 can be positioned atop the floor 122 to underlie the battery component 1400. Upstanding sidewalls 123 of the battery support bracket 121 help to keep the battery component 1400 of the costly device 1000 in proper position atop the floor surface 122.

A quite rigid and strong steel strap bracket 126 has an upper end region 125 that hooks into a loop 127 that is welded to the nearby upstanding element of the mast 130. A lower end region 129 of the strap bracket 126 overlies a small forward extension 96 of the floor 122 of the battery support bracket 121. A padlock 141 (FIG. 1) has its shackle extending through aligned holes in the lower end region 129 and in the small forward extension 96 to lock the strap bracket 126 (and, with it, the battery 1400) to the upstanding support 100.

Referring to FIG. 3, three elongate components 131, 132, 133 of the elongate, telescopically extensible and retractable mast assembly 130 are shown in a raised or extended attitude. All three components 131, 132, 133 are of generally square, tubular cross-section. The lowermost component 131 (of the three depicted components) is larger than, and receives a lower end region of the middle component 132; and, the middle component 132 is larger than, and receives a lower end region of the uppermost component 133 (of the three depicted components). As those who are skilled in the art will readily recognize, the elongate mast 130 can also include additional components, or components of different lengths than are depicted in FIG. 3.

A plurality of aligned sets of holes 134 are formed through the telescopically connected mast sections 132 and 133— and through any other telescopically connected mast sections that may be used to form the elongate, upstanding mast assembly 130. Where adjacent pairs of mast components are concerned, at least some of the aligned sets of the holes 134 that are formed through two of the adjacent mast sections are provided with collars 140 on opposite sides of the mast components so that lockable hitch pins 150 (such as are shown in FIG. 5) can have their enlarged diameter end components protectively enclosed by the collars 140—and, the collars 140 have holes 142 formed therethrough near the outer ends of the collars so that padlocks 141 can be installed on the collars 140 in the manner shown in FIG. 6.

Indeed, all adjacent pairs of the elongate, telescopically connected mast components are preferably connected by inserting lockable hitch pins 150 such as are shown in FIG. 5 through aligned holes 134 (including ones of the aligned holes 134 that are provided with collars 140). By this arrangement, regardless of whether the mast 130 is retracted (lowered) as shown in FIG. 1, or extended (raised) as shown in FIG. 2, adjacent pairs of mast components are always locked together by use of the locking hitch pins 150. Simply by removing and repositioning the selected ones of the locking hitch pin assemblies 150 (shown in FIG. 5) in other aligned holes 134 of the adjacent pairs of mast sections, the effective length of the upstanding mast 130 can be altered, causing such costly devices or components thereof as are carried at the top of the mast 130 to be held at a selection of above-ground heights.

Regardless of however many sections may form the mast assembly 130, it is preferred that the mast assembly 130 be capable (when its sections all are fully extended) to support the costly device 1000 components 1100, 1200 at a variety of selected heights, with the fully extended mast assembly 130 being capable of supporting the costly device 1000 components 1100, 1200 at a height of at least about 12 feet above a ground support surface (not shown) atop which the massive concrete barrier segment 111 is positioned. Mast heights of 16 to 24 feet are quite possible, and are not all that unusual—in order to ensure that the antenna components 1100 and 1200 are suitably positioned for line-of-sight signal reception and transmission.

Figure 6:
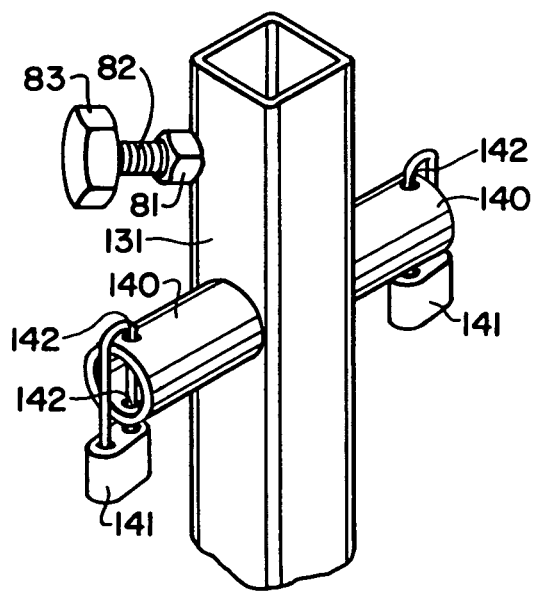
FIG. 6 is a perspective view similar to FIG. 5, but showing only one of the mast components, with the view showing padlocks that have their shackles extending through holes formed through the tubular collars after the lockable hitch pin (shown in FIG. 5) has been inserted through the aligned holes of the mast components (both shown in FIG. 5) and into the depicted tubular collars.

To deter and hopefully prevent disassembly attacks on the upstanding mount 100, the present invention preferably makes generous use of padlockable tubular collars 140 to protectively enclose exposed formations of fasteners that might be engaged by tools and loosened or removed as part of a disassembly attack. At multiple locations on the base assembly 110 and on the mast assembly 130, threaded fasteners (such as are indicated by the numerals 117 in FIG. 2) have tool engageable formations (such the hex heads of bolts, and the hex outer configuration of nuts) that are preferably protectively shrouded by the tubular collars 140; and, in many instances, the tubular collars 140 are provided with holes 142 near their outer end regions to receive the shackles of the padlocks 141 such as are shown in FIGS. 1 and 6. At other locations where the lockable hitch pins 150 of FIG. 5 are used, tubular collars 140 and padlocks 142 also are used to protect end regions of the lockable hitch pins 150.

Referring to FIG. 5, to deter rattling of adjacent pairs of the telescopically extensible sections of the mast 130, such adjacent pairs of slidably connected mast sections as the depicted sections 131, 132 preferably have the outer mast section 131 provided with a threaded nut 81 welded onto a corner of the mast section 131 adjacent a hole (not shown) that lets a threaded bolt 82 provided with a large knob 83 encompassing the bolt head (not shown) to have its threaded stem tightened into the nut 81 to clamp against the mast section 132 to prevent rattling.

Referring to FIG. 7, such costly device components as the base station control box 1300 that may be mounted on lower regions of the mast 130 are preferably held securely in place through the use of pairs of symmetrically configured, hardened steel strap brackets 161 that are shaped to perimetrically embrace central portions of whatever is to be securely attached to an adjacent mast component. In FIG. 7, for example, hardened steel strap brackets 161 are shaped to perimetrically embrace a central region of the base station control box 1300 and an adjacent region of the nearby mast component 131. Conventional fastener components such as bolts 162, washers 163 and nuts 164 are tightened in place after extending through holes formed in the strap brackets 161—and the strap brackets 161 themselves have holes 165 formed therethrough that closely receive cylindrical projections 166 provided on opposite sides of the mast component 131.

Referring to FIG. 8, a hook 167 on the back of the base station control box 1300 is inserted through a loop 168 welded to the mast component 130, and a short support shelf 169 welded to the mast component 130 underlies and supports the base station control box 1300. A padlock 141 that has its shackle extending through aligned holes 94 of formed through the strap brackets 161 completes the secure mounting of base station control box 1300 on the mast 130. Actually, the hardened and extremely stiff strap brackets 161 are so carefully configured to closely embrace the base station control box 1300 and the nearby mast component 130 that, even if the bolts 162 are removed from the strap brackets 161, the strap brackets 161 are still extremely difficult to remove—so the base station control box component 1300 remains securely clamped to the mast 130.

A recently developed alternative mount that permits the base station control box 1300 to be supported in a substantially horizontal attitude (instead of being supported substantially vertically as shown in FIGS. 7 and 8) is indicated generally by the numeral 250 in FIGS. 15 and 16. Referring to FIGS. 15 and 16, the mount 250 is much like the battery box 120 shown in FIGS. 1 and 2. Just as the battery box of FIGS. 1 and 2 is a tray-like structure attached to a component of the mast 130 and having a substantially horizontal platform or floor 122 with upstanding sidewalls 123 and an overlying strap bracket 126 having an upper end region 125 that hooks behind a mast-carried loop 127, and a lower end region 129 that is padlockable to an extension 96 of the platform or floor 122, the mount 250 is a tray-like structure attached to a component of the mast 130 and having a substantially horizontal floor 252 with upstanding sidewalls 253 and an overlying strap bracket 256 having an upper end region 255 that hooks behind a mast-carried loop 257, and a lower end region 259 that is padlockable to an extension 296 of the platform or floor 252. Just as the strap-bracket 126 shown in FIGS. 1 and 2 that is used with the battery box 120 has a top surface and a depending side surface that are configured to extend closely along top and side surfaces of the battery 1400, the strap-bracket 256 shown in FIG. 15 has top and depending side surfaces that are configured to extend reasonably closely along top and side surfaces of the base station control box 1300 (shown simply as a box-like structure depicted by broken lines in FIGS. 15 and 16). Just as the strap-bracket 126 is secured by a padlock 141, the strap-bracket 256 is secured by a padlock 141.

Referring to FIG. 9, a simple set of components (indicated generally by the numeral 170) are assembled to provide such combination bearing and torque-disconnect coupler assemblies as are indicated also by the numeral 170 in FIG. 10. The components shown in FIG. 9 include a lower cup-like, upwardly-opening component 171, into which is lowered a commercially purchased bearing 172. To secure the bearing 172 in place, a tubular member 98 is welded to a top portion of the cup-like, upwardly opening component 171. Either or both of the components 171, 98 are machined (before being assembled) on their insides as may be needed to ensure that, when the tubular member 98 and the cup-like component 171 are welded together, the bearing 172 is very securely retained in the welded assembly of the components 171, 98 so an outer element 173 of the bearing 172 cannot turn relative to the components 171, 98—but, an inner element 174 of the bearing 172 can turn nicely within the outer element 173.

The nice outer/inner element construction of the bearing 172 makes it rather easy to turn this particular type of bearing 172 into a so-called torque-disconnect coupler; and, a further advantage of the bearing 172 is that the bearing 172, by its very nature, is a commercially available assembly that prevents the inner member 174 from moving axially (i.e., along the axis 203) relative to the outer member 173)—which is to say that the bearing 172 actually can serve quite nicely both to perform its originally intended function as a bearing—while also providing the necessary relatively turnable inner and outer concentrically arranged components of a so-called torque-disconnect coupler.

Turning the bearing 172 into a torque-disconnect coupler is a simple matter of drilling a hole straight through the upstanding side wall of the cup-shaped housing and through both the outer and inner elements 173, 174—to provide the aligned passages 176, 177, 178 that are shown in the sectional view of FIG. 11. Such drilling of the bearing 172 is best accomplished after the bearing 172 has been installed in the welded assembly of the cup-shaped member 171 which has the tubular member 98 that are shown in FIG. 9 welded together, as shown in FIG. 10. The hole is drilled so that the aligned passages 176, 177, 178 (shown in FIG. 11) are sized to receive the elongate rod-like tool 190 in a slip fit.

Completing the components shown in FIG. 9 is a high strength cap screw having a hex head 175, and a threaded stem 179 that provides what will be referred to herein as a "threaded formation" 179. The hex head 175 of the bolt is rounded slightly, so it can be pressed into an interior passage 75 within the inner component 174 of the bearing 172—where the head 175 of the bolt may be additionally secured as by adhesive or by welding.

Because the inner element 174 of the bearing 172 can turn relative to the outer element 173 of the bearing 172, it may take a little effort to get the passage 178 through the inner element 174 to align with the passage 177 through the outer element 173—but, by turning the antenna 1100 that is attached to the threaded upstanding formation 179, the inner element 174 can be turned until the tool 190 can snap into the inner passage 178 (once the antenna 1200 has been turned to align the passage 178 with the passage 177, 176. When the tool 190 extends into all three of the aligned passages 176, 177, 178, the threaded formation 179 is prevented from turning about the axis 203, hence the GPS antenna 1100 can be unscrewed from the threaded formation 179. Absent the insertion of the tool 190 as described, any effort to unscrew the GPS antenna 1100 from the threaded formation 179 will simply cause the threaded formation 179 to turn about the axis 203.

The remainder of the components of the upstanding include the cylindrical shroud or guard 180 shown best in FIG. 10 as having a circular top wall 181 which has a center hole 182, and a depending cylindrical side wall 183 that is provided with a hole or passage 184. The hole or passage 184 permits the elongate tool 190 to pass through the shroud or guard 180—and, when the passage 184 is aligned with the opening or passage 176, the tool can move through the aligned passages 176, 177. Turning the antenna 1100 will cause the inner element 174 of the bearing 172 to turn, to being the passage 178 to a location where the elongate tool 190 can be further inserted into the passage 178.

Once the shroud or guard 180 has been lowered over the upstanding threaded formation 179 (by letting the upstanding threaded formation 179 extend into the center hole 182), the shroud or guard 180 can turn freely about the center hole 182 loosely receives the upstanding threaded formation 179. The lowered-into-position shroud or guard 180 will always at least partially cloak the combination bearing and torque-disconnect coupler 170—so, the holes or passages 176, 177, 178 will seldom be very visible even if one tries to look up inside of the shroud or guard 180.

Also installed loosely on the upstanding threaded formation 179 is the arm 1222 (shown in FIGS. 1 and 4) that supports the radio antenna component 1200. The arm 1222 simply has a large enough hole formed through it to lets the threaded formation 179 pass loosely therethrough. This means that the arm 1222 can always turn about the threaded formation 179, just as can the shroud or guard 180—and, so long as the GPS antenna 1100 is kept in place on the threaded formation 179, the arm 1222 cannot be removed from the threaded formation 179.

Threaded onto the upper end region of the threaded formation 179 are a jam nut 1155 (best seen in FIG. 4), and the GPS antenna 1100—which happens to have a ⅝ inch diameter downwardly opening threaded passage (not shown) that is intended to be used to mount the GPS antenna 1100. Once the antenna 1100 is tightened as tightly as it can be tightened onto the threaded formation 179, the jam nut 1155 is threaded upwardly and is securely tightened snugly into engagement with a bottom surface of the GPS antenna 1100 to very, very stiffly complete the connection of the GPS antenna 1100 to the threaded formation 179.

As a result, the only way that the GPS antenna 1100 can be removed from the threaded formation 179 is to absolutely ensure that the threaded formation 179 cannot be turned about the upstanding axis 203 (by inserting the rod-like tool 190 into the aligned passages 177, 178 of the bearing 172 (which serves as a torque-disconnect connector). Of course, the jam nut 1155 must be loosened from where it has been tightened against the bottom of the GPS antenna 1100, and then the GPS antenna 1100 can be loosened and removed.

Before the elongate tool 190 can be inserted into the aligned passages 176, 177, 178, the tool 190 must first pass through the passage 184 formed through the depending sidewall 183 of the shroud or guard 180—which cannot take place unless and until the shroud or guard 180 is turned about the upstanding axis 203 as may be needed to align the passage 184 with the passages 176, 177 and 178.

Because the simple rod-like configuration of the elongate tool 190 may give someone the idea that they can stop the outer and inner members 173, 174 of the torque-disconnect coupler assembly 170 from turning simply by inserting the blade of a screwdriver or the like through the aligned passages 184, 176, 177, 178—so, it may be desirable to complicate the appearance of the kind of elongate tool 190 that is used to insert through all of these aligned passages. FIG. 12 shows a more complex elongate tool 210 that has a key-like appearance—including an elongate stem 211, a generally rectangular portion (that may have a simple rectangular appearance as shown in FIGS. 13 and 14, or a more complex like a skeleton key—or may be even more completely configured shown in FIG. 12. The key-like elongate tool 201 also has a round and easily grasped bow 213.

Referring to FIG. 12, the key-like elongate tool 210 can pass through a keyhole shaped passage 221 in the shroud or guard 180, and can have its forward moving inner end region inserted to an extent that the rectangular forward end region 212 engages the outside surface of the depicted tubular element 201 of a simple torque-disconnect—that, as has previously been described, is fixed to a depicted uppermost mast component 133. Once the key-like tool 210 has been inserted this far, the key-like tool 210 needs to be turned a half turn about the axis of the stem 211 of the tool 210—whereupon, the key-like tool 210 can be further inserted so it passes through the upside down keyhole 222 formed through the tubular outer element 201—so that the rectangular inner end of the rectangular part 212 of the tool 210 can be further inserted into the rectangular passage 223 of the inner element 202—thereby causing the outer and inner elements 201, 202 to be "torque connected" (instead of being normally "torque disconnected" and free to turn relative to each other).

Once the outer and inner elements 201, 202 are "torque connected" by the rectangular part 212 of the key-like tool, the upstanding threaded formation 179 can no longer turn about the axis 203, and the GPS antenna 1100 can be unthreaded from the threaded formation 179.

Obviously, all the fancy cuts that one might make in the rectangular formation 212 have nothing to do with preventing the threaded formation 179 from turning—but, if one wants to give a would-be thief something to do on a cold winter's evening as he tries to duplicate a complexly configured key-like tool 210 that he has perhaps wangled a look at, let him keep warm by trying to duplicate whatever cuts and other formations he believes should be provided in the rectangular formation 212, thinking that this careful effort may add value to a tool he is crafting to use in place of a correctly configured tool 210 retained by authorized personnel.

As those skilled in the art will recognize, the theft resistant, theft deterrent methods of the present invention consist of such steps as are needed to provide and utilize a theft-resistant upstanding mount have features such as are depicted in the accompanying drawings and disclosed above or in the claims that follow.

Although the invention has been described in its preferred form with a certain degree of particularity, it is understood that the present disclosure of the preferred form has been made only by way of example, and that numerous changes in the details of construction and the combination and arrangement of parts may be resorted to without departing from the spirit and scope of the invention. It is intended that the claims that follow address such patentable features as are disclosed herein.

What is claimed is:

1. A theft resistant mount for adjustably supporting at temporary outdoor locations a costly device likely to be a target for theft, comprising:

a) a roadway barrier segment that is impossible for one person to manually carry due to at least a selected one of the weight and the size of the barrier segment, with the barrier segment including a base positionable on a generally upwardly facing support surface, and an elongate mast connected to the base and being capable of extending upwardly from the base to a selection of heights;

b) first and second elements of a bearing extending concentrically along an axis, and being capable of turning relative to each other about the axis unless and until an elongate tool is caused to extend concurrently into aligned first and second passages, with the first passage being defined by the first element, with the second passage being defined by the second element, with the first element surrounding the second element such that the first element covers the second passage to render the second passage inaccessible except through the first passage when the first and second passages are aligned, and with alignment of the first and second passages being achieved by turning at least one of the first and second elements about the axis relative to the other of the first and second elements;

c) with the first element being fixed to the mast, with the second element defining a threaded formation extending along the axis, with the costly device being tightenable to and removable from the threaded formation when, and only when, the elongate tool is inserted into the aligned first and second passages to thereby substantially prevent turning of the threaded formation about the axis;

d) a shroud that covers the first and second elements of the bearing such that the shroud at least partially cloaks from view an opening into the first passage, through which opening the elongate tool extends when the elongate tool is being inserted into the aligned first and second passages; and e) with the shroud including a generally cylindrical sidewall that encircles, at a distance spaced from, the first element of the bearing, and the generally cylindrical sidewall has a third passage extending therethrough that the elongate tool must extend through before the elongate tool can be inserted into the aligned first and second passages.

2. The theft resistant mount of claim 1 with the shroud having a circular top wall through which is formed a hole at the center of the circular top wall, with the threaded formation extending upwardly through the hole formed in the circular top wall, and with the shroud being freely turnable relative to the threaded formation, with the shroud needing to be turned about the axis in order to align the third passage of the shroud with the aligned first and second passages so the elongate tool can be inserted through the third passage of the shroud before being moved toward, for insertion into, the aligned first and second passages.

3. The theft resistant mount of claim 1 including means constraining the first and second elements from moving relative to each other in directions paralleling the axis.

4. The theft resistant mount of claim 1 with the axis being an upstanding axis when the barrier segment is oriented so the mast extends upwardly from the base.

5. The theft resistant mount of claim 1 with the elongate tool having a selected portion configured to be insertable into the first and second passages when the first second and third passages are aligned one with the other.

6. The theft resistant mount of claim 5 with the selected portion of the elongate tool being configured to minimize relative movement of the first and second elements when the selected portion extends concurrently into the aligned first and second passages.

7. The theft resistant mount of claim 1 with the elongate mast including at least a pair of adjacent elongate components that can telescopically retract and extend relative to each other, with each of the adjacent components having certain holes formed therethrough that align when the adjacent components telescopically retract, and having other holes formed therethrough that align when the adjacent components telescopically extend, and with the elongate mast additionally including lockable together hitch pin components that can be inserted into opposite end regions of, and locked together to retain the locking hitch pin in selected ones of the certain and other holes.

8. A theft resistant mount for adjustably supporting at temporary outdoor locations a costly device likely to be a target for theft, comprising:

a) a roadway barrier segment that is impossible for one person to manually carry due to at least a selected one of the weight and the size of the barrier segment, with the barrier segment including a base positionable on a generally upwardly facing support surface, and an elongate mast connected to the base and being capable of extending upwardly from the base to a selection of heights;

b) first and second elements of a bearing extending concentrically along an axis, and being capable of turning relative to each other about the axis unless and until an elongate tool is caused to extend concurrently into aligned first and second passages, with the first passage being defined by the first element, with the second passage being defined by the second element, with the first element surrounding the second element such that the first element covers the second passage to render the second passage inaccessible except through the first passage when the first and second passages are aligned, and with alignment of the first and second passages being achieved by turning at least one of the first and second elements about the axis relative to the other of the first and second elements;

c) with the first element being fixed to the mast, with the second element defining a threaded formation extending along the axis, with the costly device being tightenable to and removable from the threaded formation when, and only when, the elongate tool is inserted into the aligned first and second passages to thereby substantially prevent turning of the threaded formation about the axis;

d) with the elongate mast including at least a pair of adjacent elongate components that can telescopically retract and extend relative to each other, with each of the adjacent components having certain holes formed therethrough that align when the adjacent components telescopically retract, and having other holes formed therethrough that align when the adjacent components telescopically extend, and with the elongate mast additionally including lockable together hitch pin components that can be inserted into opposite end regions of, and locked together to retain the locking hitch pin in selected ones of the certain and other holes; and e) tubular collars having inner end regions thereof fixed to selected ones of the adjacent components of the elongate mast in alignment with selected ones of the certain and other holes so the tubular collars can surround opposite end regions of the locking hitch pin when the locking hitch pin is retained in any of the certain and other holes.

9. The theft resistant mount of claim 8 additionally including relatively small holes formed through the tubular collars near outer end regions thereof so that shackles of padlocks can extend through the relatively small holes to restrict access to opposite end regions of the locking hitch pin when the locking hitch pin is locked in any of the certain and other holes.

10. A theft resistant mount for adjustably supporting at temporary outdoor locations a costly device likely to be a target for theft, comprising:

a) a roadway barrier segment that is impossible for one person to manually carry due to at least a selected one of the weight and the size of the barrier segment, with the barrier segment including a base positionable on a generally upwardly facing support surface, and an elongate mast connected to the base and being capable of extending upwardly from the base to a selection of heights;

b) first and second elements of a bearing extending concentrically along an axis, and being capable of turning relative to each other about the axis unless and until an elongate tool is caused to extend concurrently into aligned first and second passages, with the first passage being defined by the first element, with the second passage being defined by the second element, with the first element surrounding the second element such that the first element covers the second passage to render the second passage inaccessible except through the first passage when the first and second passages are aligned, and with alignment of the first and second passages being achieved by turning at least one of the first and second elements about the axis relative to the other of the first and second elements;

c) with the first element being fixed to the mast, with the second element defining a threaded formation extending along the axis, with the costly device being tightenable to and removable from the threaded formation when, and only when, the elongate tool is inserted into the aligned first and second passages to thereby substantially prevent turning of the threaded formation about the axis; and d) with the elongate mast including a pair of adjacent elongate mast components including a first component having a substantially square cross section that extends somewhat loosely into a second component having a substantially square cross section, and a threaded, headed member is threaded through a threaded passage provided at one of four corner regions of the substantially square cross section of the second component, with an inner end region of the threaded, headed member being tightenable into engagement with a corner region of the first component to reduce rattling of the first component within the second component due to the somewhat loose fit of the first component within the second component.

11. A theft resistant upstanding mount for adjustably supporting at temporary outdoor locations a costly device likely to be a target for theft, comprising:

a) a massive concrete structure that is impossible for one person to manually carry due to at least the weight of the structure, with the structure including a base positionable on a support surface, and an elongate mast connected to the base and extensible upwardly therefrom to a selection of above-ground heights;

b) a torque-disconnect coupler having a first element and a second element that are relatively turnable about, and extend coaxially along a common axis, with the first element being fixed to the elongate mast, with the second element defining a threaded formation extending along the common axis, with the costly device being tightenable to the threaded formation to normally turn freely about the common axis in unison with the second element;

c) a tool having an elongate portion configured to be insertable substantially concurrently into both of a first passage defined by the first element and a second passage defined by the second element, but only when at least one of the first and second elements has been turned about the common axis relative to the other element to bring the first and second passages into alignment, and only when an elongate portion of a tool extends into both of the first and second aligned passages;

d) with the first element surrounding the second element such that the first element blocks access to the second passage to render the second passage inaccessible except through the first passage when the first and second passages are aligned;

e) with the tool normally retained by an entity authorized to control the whereabouts of the costly device, the tool having an elongate portion configured to be insertable into the passages and to extend substantially concurrently into both of the passages only at times when the entity wants the threaded formation to be prevented from turning about the common axis so the costly device can be tightened to, or loosened and removed from the threaded formation;

f) a shroud that covers the first and second elements such that the shroud at least partially cloaks from view an opening into the first passage; and g) with the shroud being connected to the threaded formation but being free to turn about the common axis, and defining a third passage therethrough through which the tool must pass before being inserted into the first passage, and then into the second passage.

12. The theft resistant mount of claim 11 additionally including means constraining the relatively turnable elements from translating relative to each other in directions paralleling the common axis.

13. A theft resistant mount for adjustably supporting at a selection of above-ground heights and at temporary outdoor locations a costly device likely to be a target for theft, comprising:

a) a base structure positionable on a support surface;

b) a telescopically extensible mast structure connected to and extending upwardly from the base structure and having an uppermost component that can be raised to and held at a selection of above-ground heights;

c) a torque-disconnect assembly having first and second elements extending concentrically along, and being relatively turnable about an upstanding axis unless and until an elongate tool is inserted into first and second passages when the first and second passages are aligned, with the first passage being defined by the first element which is fixed to the mast structure, with the second passage being defined by the second element, with the first element surrounding the second element such that the first element covers the second passage to render the second passage inaccessible except through the first passage when the first and second passages are aligned;

d) with the second element also defining a threaded formation that extends along the upstanding axis AND which can have the costly device both tightened thereon, and loosened therefrom, with said tightening and said loosening only being possible when the elongate tool extends concurrently into the aligned first and second passages to prevent the threaded formation from turning relative to the mast, with the first and second passages being alignable by turning the second element relative to the first element about the upstanding axis;

e) a shroud extending around and at least partially cloaking from view the first and second elements; and f) with the shroud defining a sidewall that encircles and is free to turn about the upstanding axis, the sidewall defining a third passage formed through the shroud, through which the elongate tool must move before being inserted into the aligned first and second passages.

14. The theft resistant mount of claim 13 including means constraining the first and second elements from moving relative to each other in directions paralleling the upstanding axis.

15. The theft resistant mount of claim 14 additionally including a bearing connected to the uppermost component of the mast and positioned to at least aid the second element to turn smoothly about the upstanding axis.

16. The theft resistant mount of claim 13 with the base structure comprising a segment of highway barrier that is impossible for one person to manually carry due to at least one of a weight of at least 1000 pounds of the base structure, and a size of at least 3 feet in height and multiple feet in length of the base structure.

17. A theft resistant upstanding mount for adjustably supporting at temporary outdoor locations a costly device likely to be a target for theft, comprising:
  a) a base positionable on a support surface;
  b) an elongate mast fixed to and extending upwardly from the base;
  c) a torque-disconnect assembly including a first element fixed to the elongate mast, and a second element defining a threaded formation that extends along an upstanding axis about which the first and second elements can turn relative to each other unless and until an elongate tool extends concurrently into a first passage defined by the first element and a second passage defined by the second element, which passages align to permit insertion of the elongate tool concurrently therein when the first and second elements are turned relative to each other to a particular orientation;
  d) with the first element surrounding the second element such that the first element blocks access to the second passage to render the second passage inaccessible except through the first passage when the first and second passages are aligned;
  e) with the inserted elongate tool preventing the first and second elements from turning about the upstanding axis so that a costly device can be turned about the upstanding axis 1) to be connected and tightened to, and 2) to be loosened and removed from the threaded formation;
  f) a shroud encircling the torque-disconnect assembly to cloak the torque-disconnect assembly from view; and
  g) wherein the shroud includes a generally cylindrical wall that encircles the torque-disconnect assembly, and wherein the shroud has an opening formed therethrough, through which opening the elongate tool must pass in order to be inserted into the aligned first and second passages of the first and second elements.

18. The theft resistant mount of claim 17 additionally including the elongate tool, the elongate tool having a portion configured to be insertable into the first and second passages when the second element is turned relative to the first element about the upstanding axis to bring the first and second passages into alignment with each other, with at least a part of the insertable portion of the elongate tool being operable to establish a driving connection between the first and second elements to prevent relative rotation of the first and second elements about the upstanding axis.

19. The theft resistant mount of claim 18 with the base including an assembly formed from a first set of components that includes a saddle-shaped support configured to overlie and to be clamped securely to the support surface defined by an upper part of a relatively massive barrier segment positionable atop a ground surface.

20. The theft resistant mount of claim 19 additionally including the relatively massive barrier segment positionable atop a ground surface and having an upper part that defines the support surface.

21. A theft resistant upstanding mount for supporting at least one costly device at any of a selection of above-ground heights, comprising:
  a) a massive base positionable on a support surface, with the base being impossible for one person to manually carry due to at least the weight of the base;
  b) a telescopically extensible mast fixed securely to and extending upwardly from the base;
  c) a combination bearing and torque-disconnect coupler including first and second elements that are permitted by the coupler to normally turn relative to each other about an upstanding axis, and that are prevented by the coupler from moving relative to each other along the upstanding axis, with the first element being fixed to an upper part of the mast, and with the second element defining a threaded formation extending along the upstanding axis;
  d) with the at least one costly device being threadably tightened to the threaded formation, and being unthreadable from the threaded formation only when the normal capability of the first and second elements to turn relative to each other is overridden by causing a suitably configured elongate tool to extend concurrently into aligned first and second openings, with the first opening defined by the first element and the second opening defined by the second element;
  e) with the first element surrounding the second element such that the first element covers the second opening to render the second opening inaccessible except through the first opening when the first and second openings are aligned;
  f) a shroud encircling the combination of bearing and torque-disconnect coupler to at least partially cloak the combination of bearing and torque-disconnect assembly from view; and
  g) wherein the shroud includes a generally cylindrical wall that encircles the torque-disconnect assembly, and wherein the shroud has a third opening formed therethrough, and through which the elongate tool must pass in order to be inserted into the aligned first and second openings of the first and second elements.

22. The theft-resistant mount of claim 21 with the mast having at least two adjacent, telescopically extensible and retractable components lockable to each other when extended, and when retracted, by inserting a lockable hitch pin through aligned holes formed through each of the two components.

* * * * *